(12) United States Patent  
Chung

(10) Patent No.: US 11,214,946 B2
(45) Date of Patent: Jan. 4, 2022

(54) ARTICULATING FAUCET

(71) Applicant: Kohler Co., Kohler, WI (US)

(72) Inventor: Chanseol Chung, Milwaukee, WI (US)

(73) Assignee: KOHLER CO., Kohler, WI (US)

( * ) Notice: Subject to any disclaimer, the term of this patent is extended or adjusted under 35 U.S.C. 154(b) by 142 days.

(21) Appl. No.: 16/429,970

(22) Filed: Jun. 3, 2019

(65) Prior Publication Data
US 2019/0368172 A1 Dec. 5, 2019

Related U.S. Application Data

(60) Provisional application No. 62/680,282, filed on Jun. 4, 2018.

(51) Int. Cl.
E03C 1/04 (2006.01)
F16L 27/08 (2006.01)

(52) U.S. Cl.
CPC ........ E03C 1/0404 (2013.01); F16L 27/0804 (2013.01); E03C 2001/0414 (2013.01); Y10T 137/9464 (2015.04)

(58) Field of Classification Search
None
See application file for complete search history.

(56) References Cited

U.S. PATENT DOCUMENTS

| | | | | |
|---|---|---|---|---|
| 1,255,577 A | * | 2/1918 | Berry | F16L 11/18 285/107 |
| 1,276,117 A | * | 8/1918 | Riebe | F16D 3/848 464/171 |
| 2,696,264 A | * | 12/1954 | Colmerauer | E21B 43/103 166/235 |
| 4,054,128 A | * | 10/1977 | Seufert | A61B 1/00082 600/116 |
| 5,865,378 A | * | 2/1999 | Hollinshead | F16L 11/18 239/587.1 |
| 6,164,570 A | * | 12/2000 | Smeltzer | E03C 1/021 138/120 |
| 6,626,210 B2 | * | 9/2003 | Luettgen | E03C 1/021 138/120 |
| 2005/0103903 A1 | * | 5/2005 | Shamir | E03C 1/0408 239/587.2 |
| 2011/0038064 A1 | * | 2/2011 | Xhunga | F21S 8/081 359/811 |

(Continued)

FOREIGN PATENT DOCUMENTS

KR 20110136087 12/2011

OTHER PUBLICATIONS

Chinese First Office Action on CN Patent Application No. 201910476937.9 dated Dec. 1, 2020 12 pages.

Primary Examiner — Daphne M Barry
(74) Attorney, Agent, or Firm — Foley & Lardner LLP

(57) ABSTRACT

A faucet having a base, an articulable spout, and a valve operable in an open position and a closed position to control the flow of water to the outlet. The base is configured to mount to a support. The spout includes an outlet for dispensing water and a plurality of segments operatively coupled together sequentially, with a first segment of the plurality of segments rotatably coupled to the base. The plurality of segments are rotatable relative to one another and to the base to move the outlet between a first position, in which the valve is in the closed position, and a second position, in which the valve is in the open position.

20 Claims, 16 Drawing Sheets

(56) References Cited

U.S. PATENT DOCUMENTS

2019/0264838 A1\* 8/2019 Chung .................. F16L 37/004
2019/0264848 A1\* 8/2019 Chung .................... F16L 27/08
2019/0264849 A1\* 8/2019 Chung ................ F16L 27/0849
2019/0372322 A1\* 12/2019 Tseng ...................... F16L 11/18

\* cited by examiner

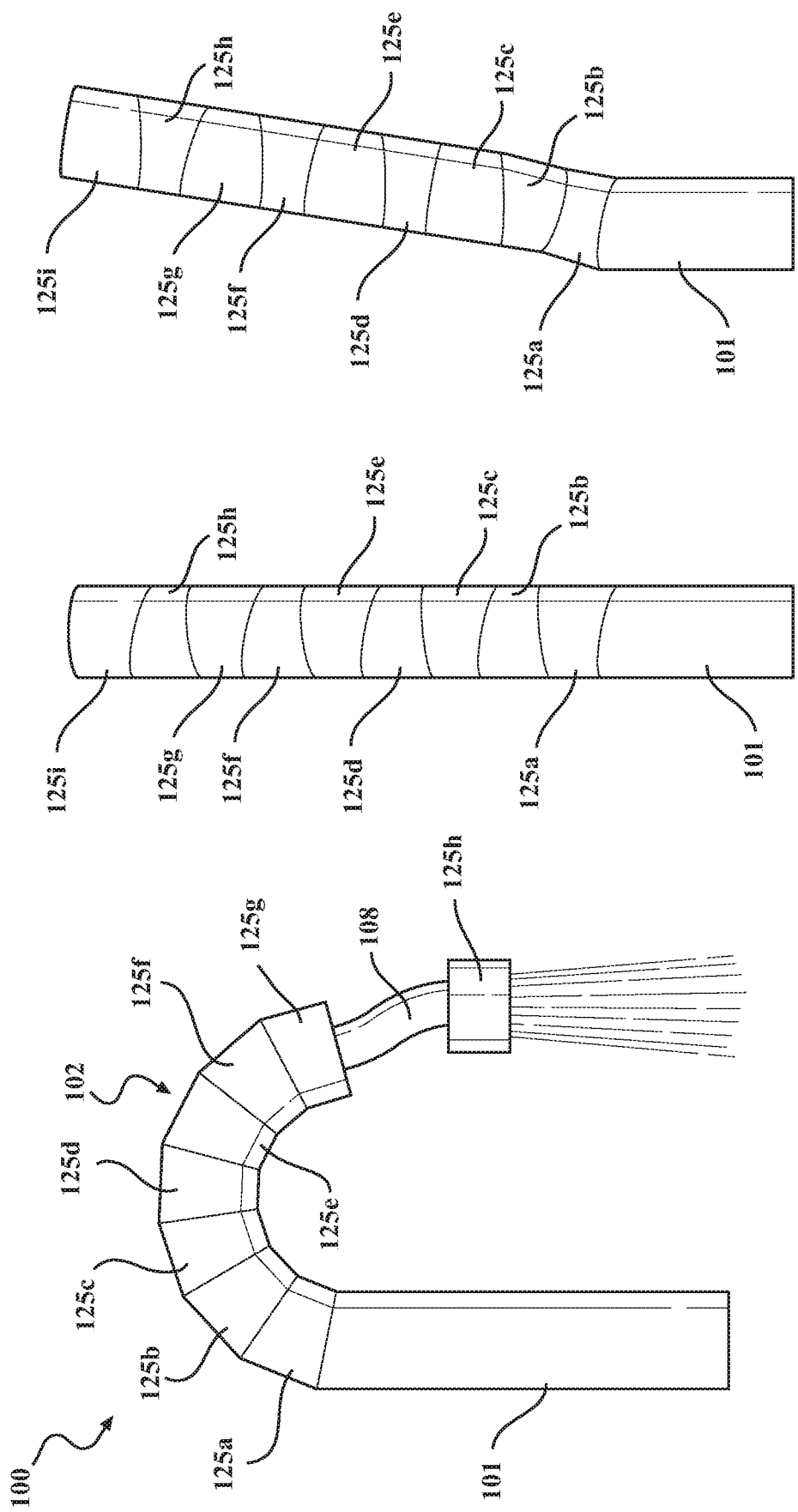

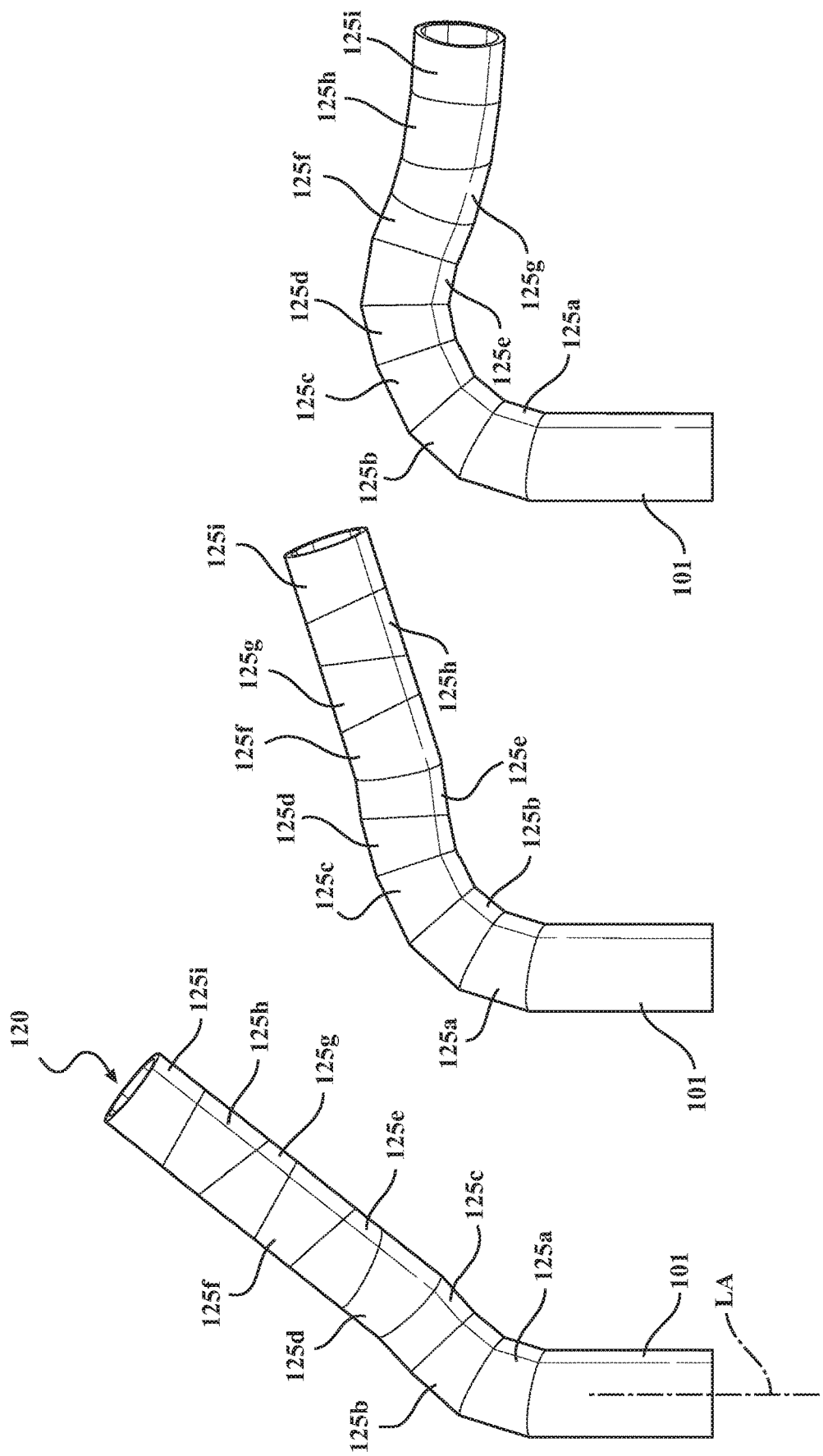

ARTICULATING FAUCET

CROSS-REFERENCE TO RELATED PATENT APPLICATIONS

This application claims priority to and the benefit of U.S. Provisional Patent Application No. 62/680,282, filed on Jun. 4, 2018. The foregoing application is incorporated herein by reference in its entirety.

BACKGROUND

The present application relates generally to the field of faucets. More specifically, the present application relates to faucets that include spouts having segments that articulate to change the shape of the spout and to reposition an outlet of the faucet.

SUMMARY

At least one embodiment of the application relates to a faucet that includes a base, an articulable spout, and a valve, which is operable in an open position and a closed position to control the flow of water to the outlet. The base is configured to mount to a support. The spout includes an outlet for dispensing water and a plurality of segments operatively coupled together sequentially, with a first segment of the plurality of segments rotatably coupled to the base. The plurality of segments are rotatable relative to one another and to the base to move the outlet between a first position, in which the valve is in the closed position, and a second position, in which the valve is in the open position.

At least one embodiment of the application relates to a faucet that includes a stationary base and a spout. The base is stationary and has a first end, which is mountable to a support. The spout is operatively coupled to a second end of the base, the spout has an outlet for dispensing water and the spout is articulable relative to the base between a first position and a second position. The base and the spout together may have a substantially cylindrical shape in the first position, and the base and the spout may together have a substantially inverted J-shape in the second position.

At least one embodiment of the application relates to a faucet that includes a base and a spout. The base is configured to extend along a longitudinal axis and the base includes a first (e.g., bottom) end that is configured to mount to a support. The spout includes a first segment movably coupled to a second (e.g., top) end of the base, a last segment having an outlet for dispensing water, and a plurality of intervening segments provided between the first segment and the last segment. Each of the plurality of intervening segments is movable relative to the first segment to move the last segment between a first position, in which each of the plurality of intervening segments is aligned along the longitudinal axis, and a second position, in which each of the plurality of intervening segments is aligned along an arcuate axis that intersects the longitudinal axis.

BRIEF DESCRIPTION OF THE DRAWINGS

FIG. 3 is a side schematic view of the faucet shown in FIG. 2 in the second position with a detachable spray head.

FIG. 4 is a side view of the faucet shown in FIG. 1 in the first position.

FIG. 5 is a side view of the faucet shown in FIG. 4 moving from the first position toward the second position.

FIG. 6 is a side view of the faucet shown in FIG. 4 moving from the first position toward the second position.

FIG. 7 is a side view of the faucet shown in FIG. 4 moving from the first position toward the second position.

FIG. 8 is a side view of the faucet shown in FIG. 4 moving from the first position toward the second position.

DETAILED DESCRIPTION

Figure 2:
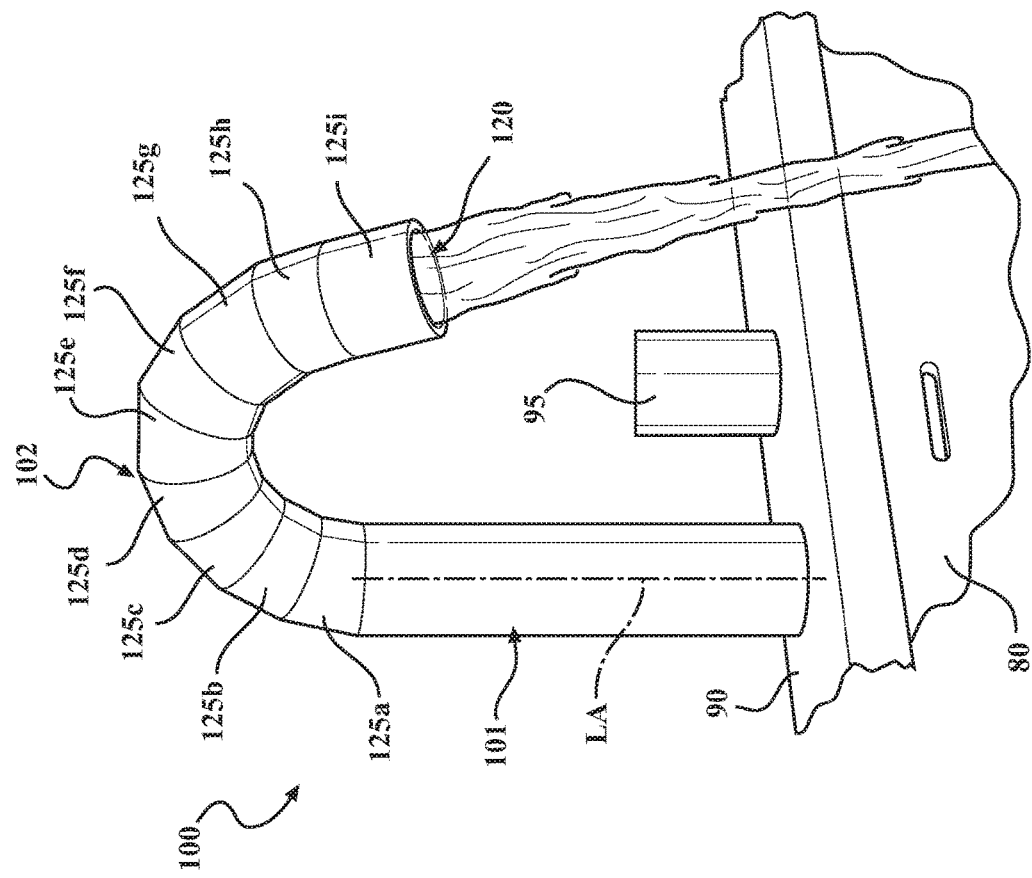
FIG. 2 is a front perspective view of the faucet shown in FIG. 1 in a second position.

Referring generally to the figures, disclosed herein are faucets having articulating spouts. That is, each spout includes one or more segments (e.g., parts, members, elements, etc.) that can articulate relative to a base and/or other segments of the spout. The articulating faucets can control the operation (e.g., water flow) of the faucet based on articulation of part of the faucet body, such as a spout of the faucet, relative to another part of the faucet body, such as a base of the faucet. Traditional faucets rely on one or more handles or sensors to control such operation of the faucet.

By way of example, at least one embodiment disclosed herein relates to a faucet having a base mountable to a support, a spout that articulates relative to the base, and a valve operable in an open position and a closed position to control the flow of water to an outlet of the spout through which water is dispensed. The spout can include a plurality of segments operatively coupled together sequentially, with a first segment rotatably coupled to the base. The remaining segments are rotatable relative to the first segment and the base to move the outlet between a first position, in which the valve is in the closed position, and a second position, in which the valve is in the open position.

The plurality of segments can rotate sequentially starting with the first segment and ending with an end segment of the plurality of segments. The end segment can include the outlet. Alternatively, the plurality of segments can rotate randomly or can rotate substantially simultaneously to move the outlet between the first and the second positions.

Each segment can be rotated by an electro-mechanical actuator, such as a motor and/or a cable operatively coupled to the motor and to the associated segment so that the motor can rotate the associated segment through the cable. The actuator can include a plurality of cables operatively coupled to the motor, with at least one cable associated with each segment to rotate the associated segment through the associated cable(s). As another example, each segment can be rotated by a force created by the flow of water through the faucet (e.g., to the outlet).

As another example, each pair of adjacent segments can be rotatably coupled through a universal joint, a flexible joint, or any other suitable coupling.

The plurality of segments can form a substantially cylindrical shaped spout when the outlet is in the first position and can form a non-cylindrical shaped spout when the outlet is in the second position. For example, the segments can form an arcuate shaped spout when the spout is in the second position such that the base and the spout together have a substantially inverted J-shape, and the segments can form a shape that is different than the arcuate shape spout in the first position.

Also for example, at least one embodiment disclosed herein relates to a faucet having a stationary base and a spout. The stationary base has a first end, which is mountable to a support. The spout is operatively coupled to a second end of the base, the spout has an outlet for dispensing water, and the spout is articulable relative to the base between a first position and a second position. The base and the spout together can form a substantially cylindrical shape in the first position and a substantially inverted J-shape in the second position.

The spout includes a plurality of segments operatively coupled together sequentially, where each segment is articulable relative to the other segments and relative to the base to move the spout between the first and second positions. A first segment is rotatably coupled to the base, where each additional segment is rotatable relative to the first segment and the base to articulate the spout between the first and second positions. The spout includes an end segment having the outlet. The end segment can be detachable from an adjacent segment. A flexible hose can fluidly connect the outlet (e.g., of the end segment) to the base.

At least one embodiment disclosed herein relates to a faucet having a base and a spout. The base extends along a longitudinal axis and has a first (e.g., bottom) end that is mountable to a support. The spout includes a first segment movably coupled to a second (e.g., top) end of the base, a last segment having an outlet for dispensing water, and a plurality of intervening segments provided between the first and last segments. Each intervening segment is movable relative to the first segment to move the last segment between a first position, in which the intervening segments align along the longitudinal axis, and a second position, in which the intervening segments align along an arcuate axis that intersects the longitudinal axis.

Each intervening segment includes a hollow inner body and an outer body. Each inner body has a bore through which a water line can route, and each inner body is rotatable coupled to the inner body of at least one adjacent intervening segment. The outer body is fixedly coupled to the associated inner body such that the outer body rotates with the associated inner body, and the outer body defines a portion of an exterior shape of the faucet.

Each intervening segment includes a bearing that is disposed in the associated bore between the associated inner body and the water line. Each bearing has an annular channel that receives an annular flange of the associated inner body to retain the bearing relative to the inner body. The inner body includes two or more parts, such as a first part and a second part, where each part defines at least a portion of the annular flange. Each intervening segment can optionally include a magnet that magnetically attracts another magnet (or ferromagnetic portion) of an adjacent intervening segment in at least one position.

One or more cables can be used to control movement (e.g., articulation) of the segments. For example, a first cable can be routed through a first channel of at least one intervening segment so that the first cable rotates the at least one intervening segment in a first rotational direction about a pivot axis. Also for example, a second cable can be routed through a second channel of the at least one intervening segment so that the second cable rotates the at least one intervening segment in a second rotational direction about the pivot axis, where the second rotational direction is different than (e.g., opposite to) the first rotational direction.

Figure 1:
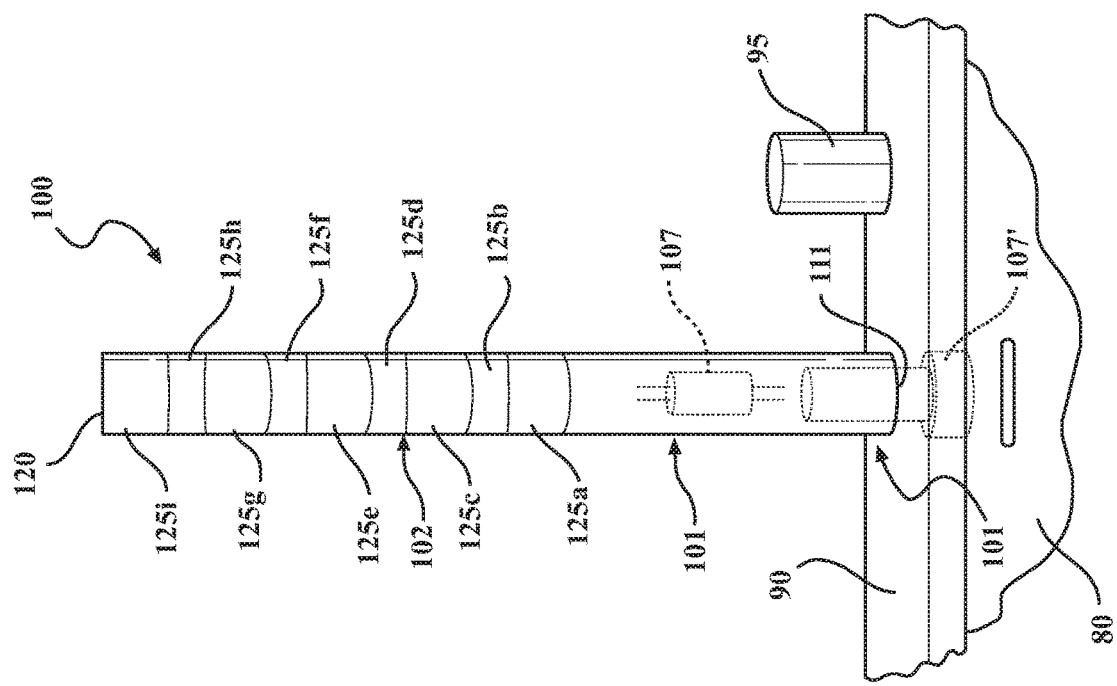
FIG. 1 is a front perspective view of an exemplary embodiment of an articulating faucet in a first position, according to this application.

Turning to the Figures, FIGS. 1-8 illustrate an exemplary embodiment of a faucet 100 that is mounted to a support in the form of a sink deck 90 (e.g., rim, mounting surface, etc.) in FIGS. 1 and 2. A controller 95 can be used to control the functionality (e.g., turn on/off fluid flow, temperature, etc.) of the faucet 100. As shown in FIGS. 1 and 2, the controller 95 is located remotely (e.g., separated from) the faucet 100. However, the controller 95 may be attached to (e.g., part of) the faucet 100. The controller 95 can control a flow rate and/or a temperature of water being discharged from the faucet 100. The controller 95 can be manually operable (e.g., a handle, knob, etc.) or automatically operable (e.g., including one or more than one sensor). According to at least one embodiment, the controller 95 controls both the flow rate and the temperature of water through the faucet, such as upon rotation. Initial rotation from an off position can turn on the flow of water through the faucet, where continued rotation can increase the temperature of water. According to at least one embodiment, the faucet 100 is turned on and off by one or more sensors (e.g., detecting presence of a person), and the controller 95 controls temperature of the flow of water.

Also shown in FIGS. 1-8, the faucet 100 includes a base 101 and a spout 102. The faucet 100 also includes a valve that controls water flow through the faucet. In an open position, water flows through the valve to an outlet of the faucet, and in a closed position, water is prevented from flowing to the outlet of the faucet by the valve. As shown in FIG. 1, the valve 107 can be located within the faucet 100, such as within the base 10, or the valve 107' can be located outside the faucet 100, such as below the support, depending on the application.

The base 101 of the faucet 100 is mountable to a support and is hollow, such as to house other elements/components of the faucet (e.g., waterway, valve, etc.). As shown in FIGS. 1 and 2, the base 101 has a substantially cylindrical shape extending along a longitudinal axis LA between a first end 111 (e.g., bottom end), which is mounted to the sink deck 90 of a sink 80, and a second end 112, which supports the spout 102. The base 101 can be fixed (i.e., remain stationary relative to the support) or can be rotatable relative to the support once mounted to the support.

Figure 10:
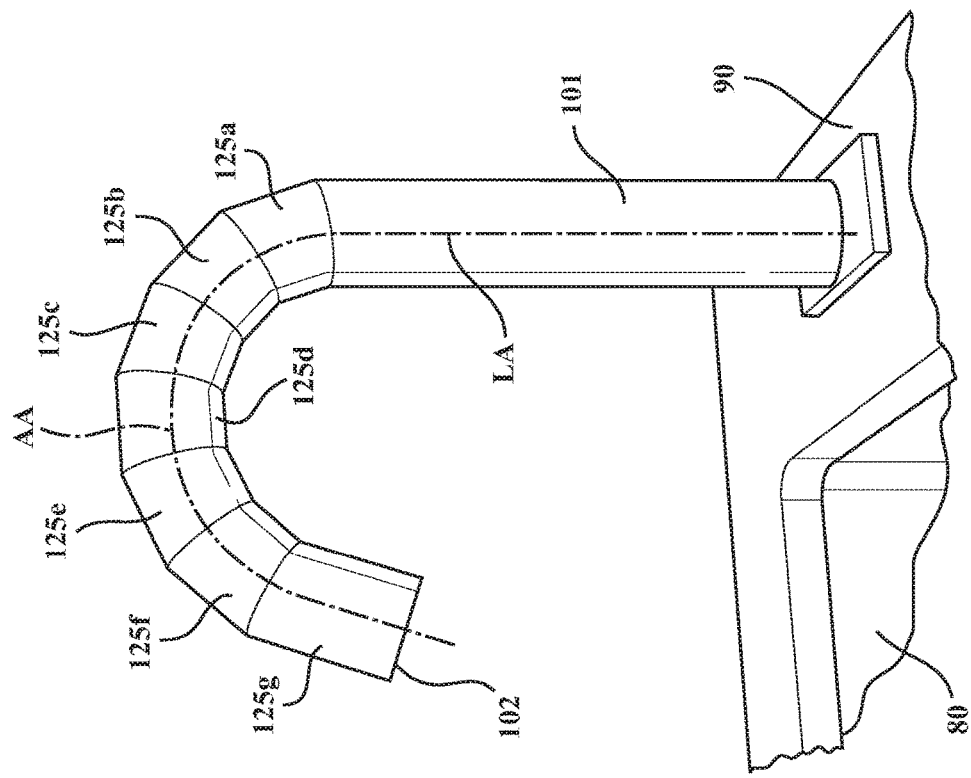
FIG. 10 is a side perspective view of the faucet shown in FIG. 9 in a second position.
Figure 9:
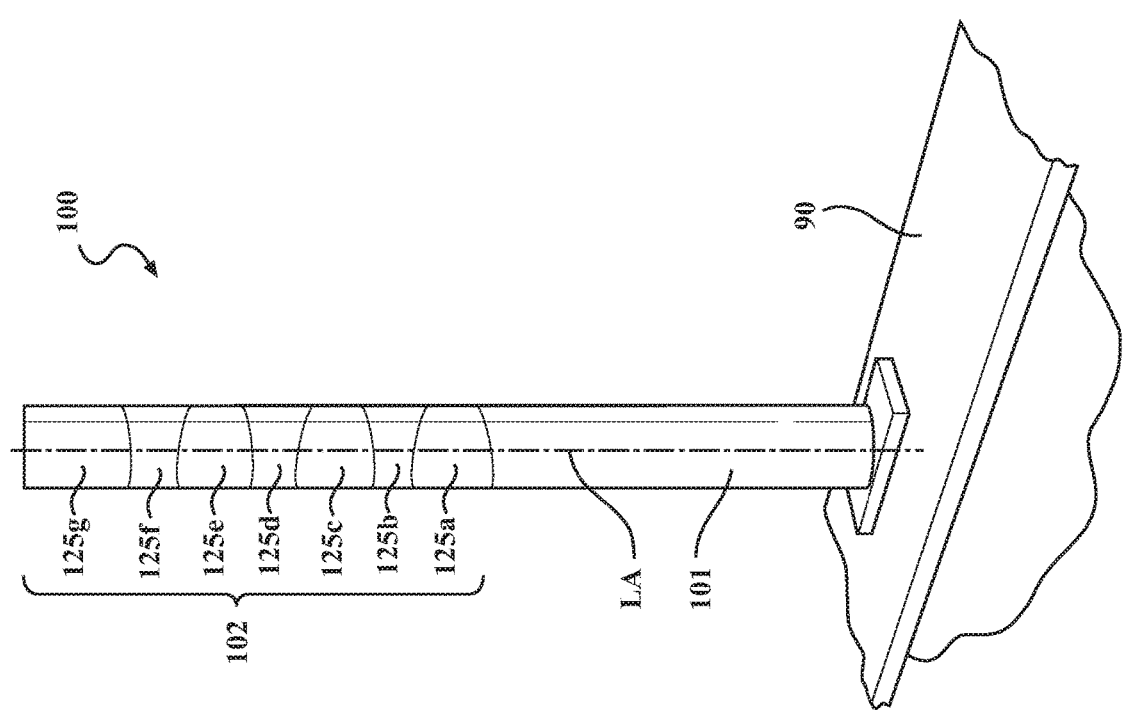
FIG. 9 is a perspective view of an exemplary embodiment of an articulating faucet in a first position.
Figure 11:
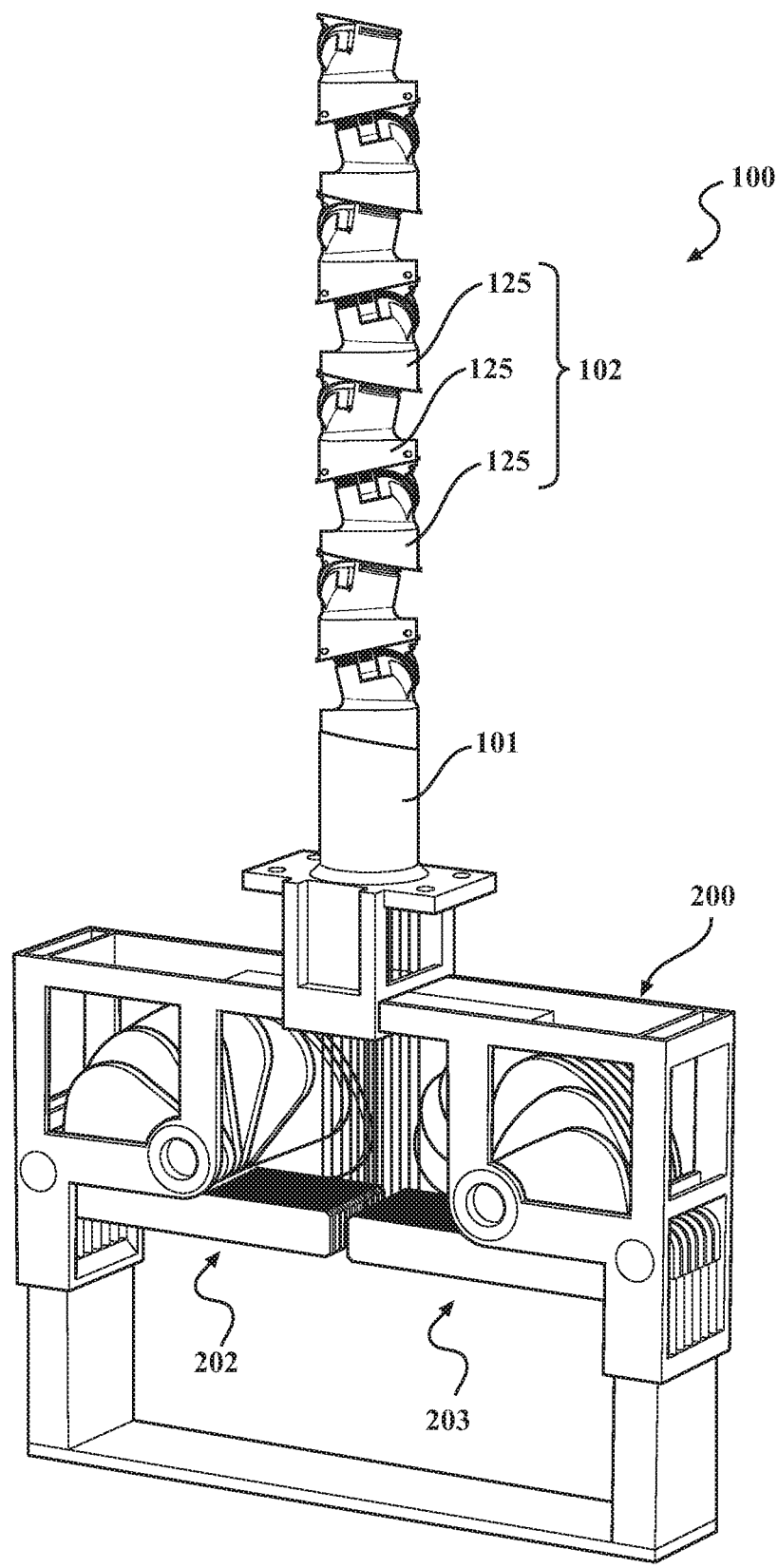
FIG. 11 is a perspective view of an exemplary embodiment of an articulating faucet and mechanical actuator.
Figure 12:
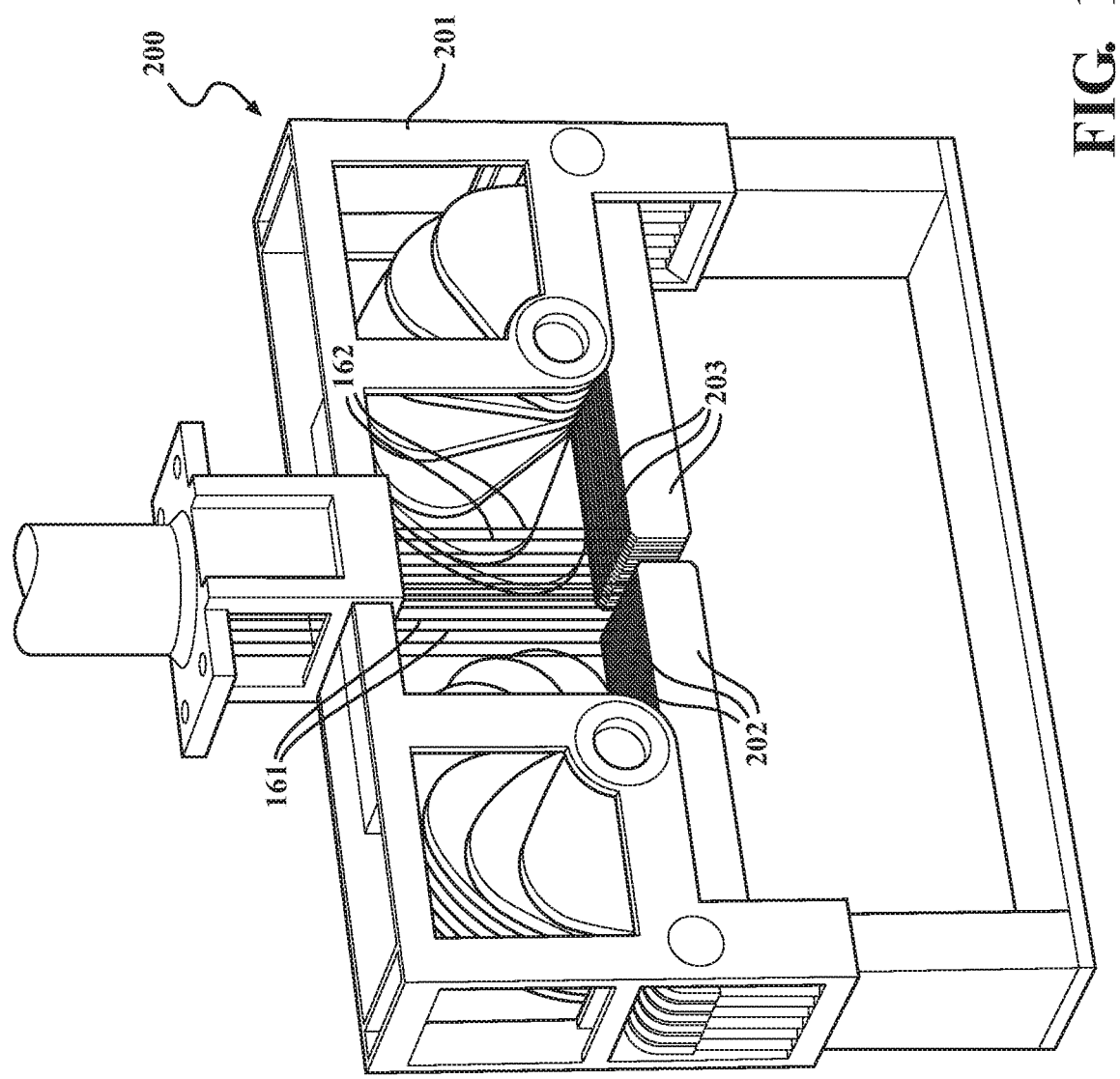
FIG. 12 is a detail view of a portion of the faucet and mechanical actuator shown in FIG. 11.
Figure 13:
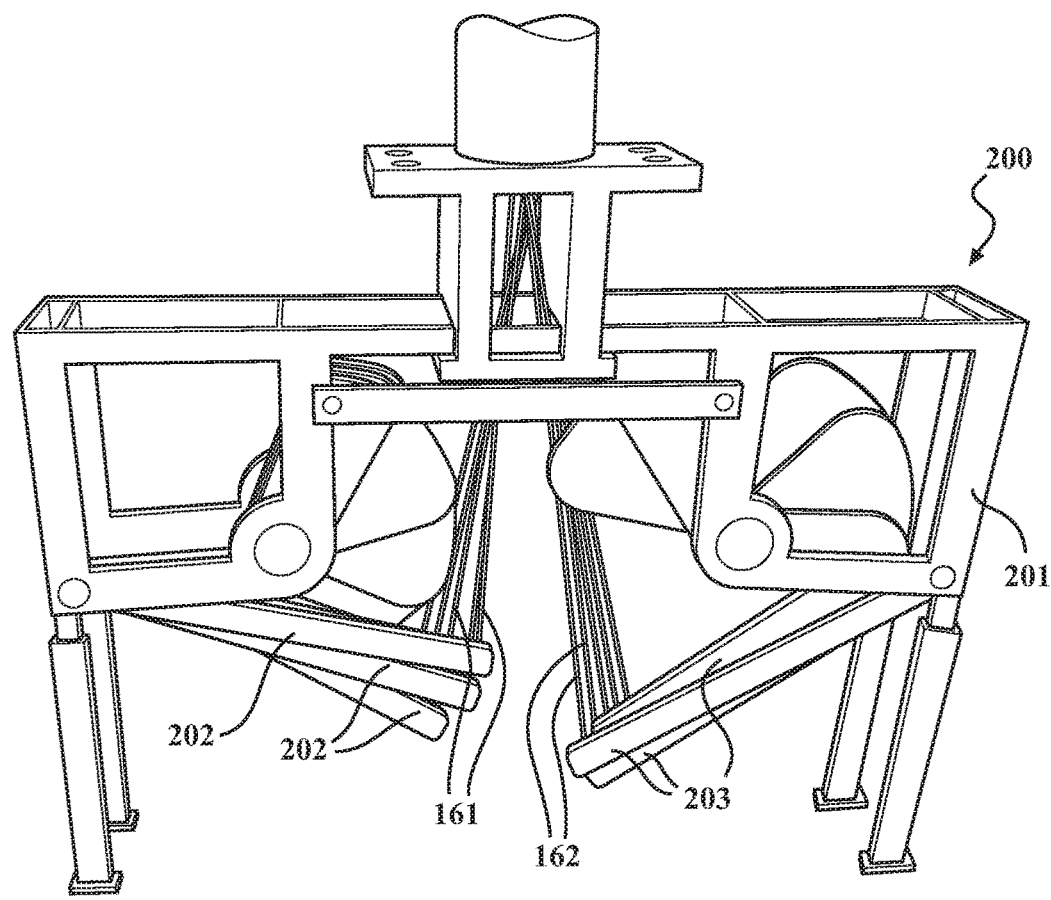
FIG. 13 is a perspective view of the faucet and mechanical actuator shown in FIG. 11.
Figure 14:
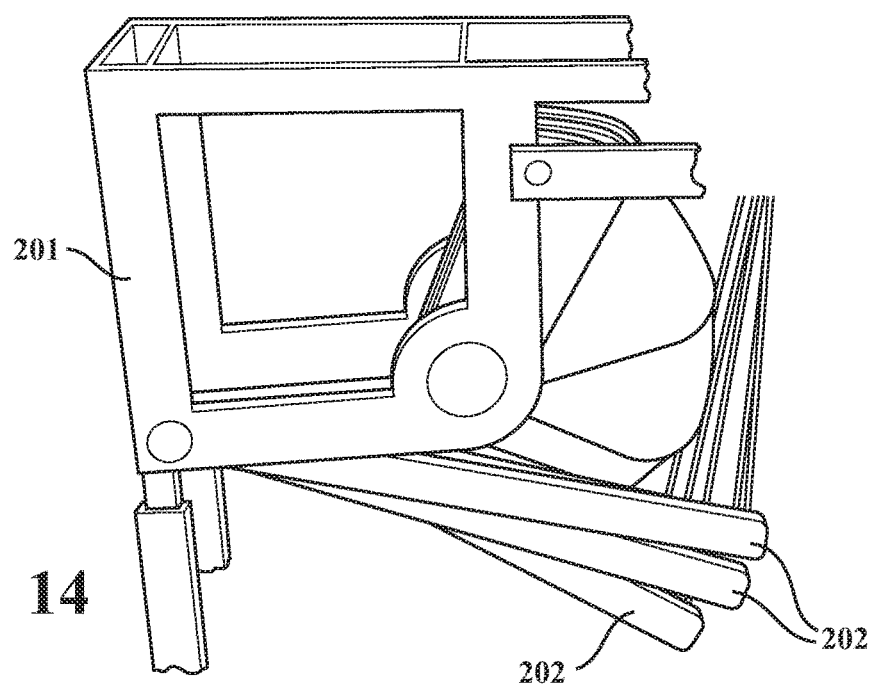
FIG. 14 is another perspective view of the faucet and mechanical actuator shown in FIG. 11.
Figure 15:
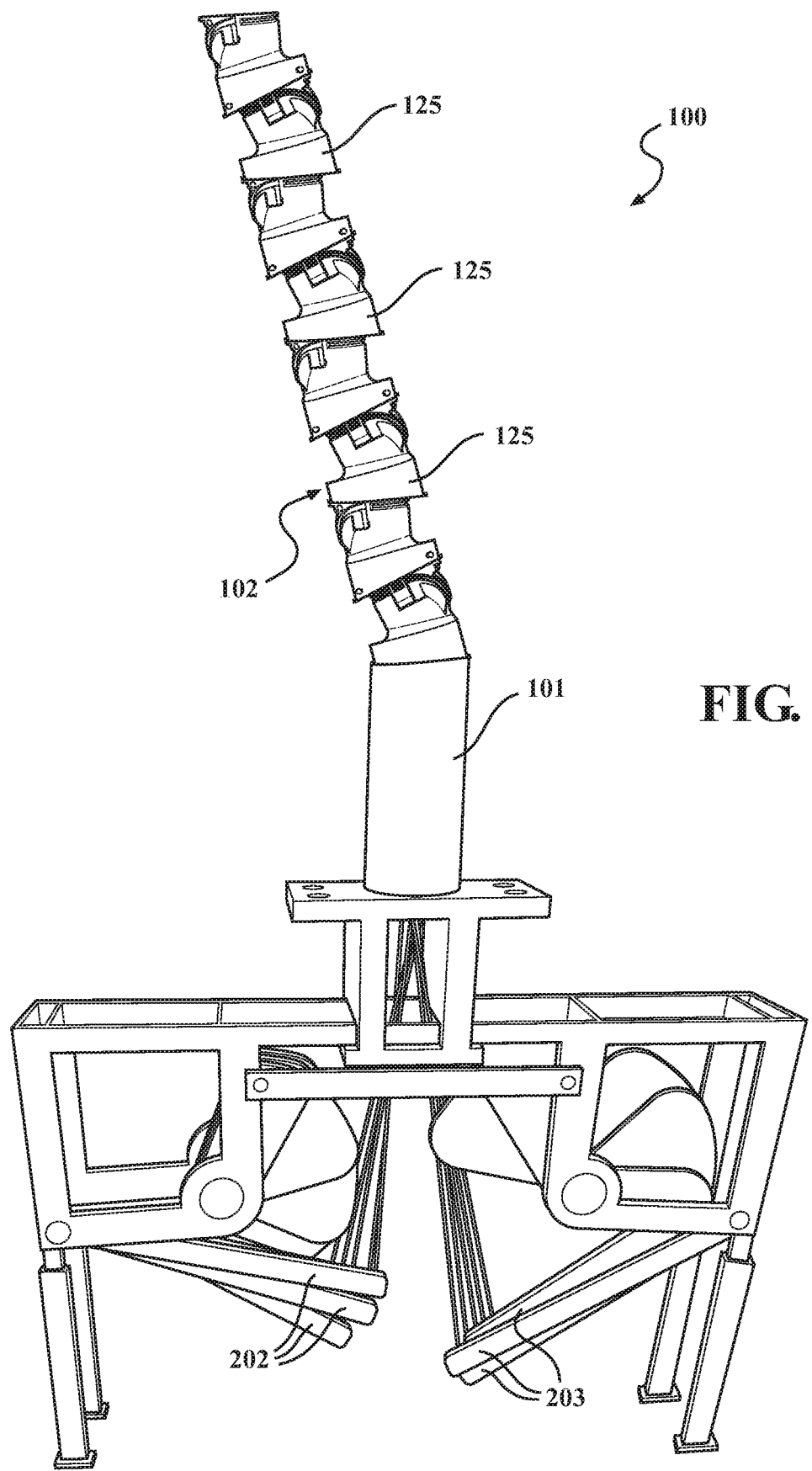
FIG. 15 is a detail view of a portion of the faucet and mechanical actuator shown in FIG. 13.

As shown best in FIGS. 1, 2, and 4-8, the spout 102 of the faucet 100 is articulable (e.g., reconfigurable, rearrangeable, moveable, etc.) between a first (e.g., non-use) position and a second (e.g., use) position. FIG. 1 shows the faucet 100/spout 102 in an exemplary non-use position with the spout 102 extending upward from the second end 112 of the base 101 and having a substantially cylindrical shape that complements the substantially cylindrical shape of the base 101. Thus, in the non-use position shown, an outlet 120 of a first end 121 of the spout 102 is positioned opposite a mounting end/surface of the base 101. In FIG. 1, the outlet 120 in the first end 121 of the spout 102 faces upwardly away from the sink deck 90 to which the base 101 is mounted. FIG. 2 shows the faucet 100/spout 102 in a use position with the spout 102 extending out over the sink 80 (beyond the sink deck 90) with the outlet 120 positioned to direct water into a basin of the sink 80. In the use position shown, a second end 122 of the spout 102 is operatively coupled to the second end 112 of the base 101, and the spout 102 has a curved (e.g., arcuate) shape that together with the base 101 forms an inverted J-shaped faucet 100. As shown in FIG. 9, a center line of the spout 102 is aligned along (e.g., coincident with) the longitudinal axis LA of the base 101 in the first position, whereas, as shown in FIG. 10, the spout 102 is aligned along an arcuate axis AA that intersects the longitudinal axis LA in the second position. Thus, the spout articulates to change the shape of the faucet, rather than merely moving the faucet while maintaining the same shape such as with swivel faucets. Notably, the spout 102 may form other shapes in the first and second positions. For example, the spout may be non-cylindrical in the first position and/or the second position, which may or may not complement the base.

The spout 102 includes one or more segments 125 that provide articulation of the spout (relative to the base) between the first and second positions. As shown in FIGS. 1, 2 and 4-8, the faucet 100 includes nine segments 125a-125i. However, the faucet can include any number of segments. By way of non-limiting examples, the faucet 100 shown in FIG. 3 includes eight segments 125a-125h, and the faucet 100 shown in FIGS. 9 and 10 includes seven segments (labeled 1-7 in each figure). Notably, the number of segments of the spout may be tailored, such as to the overall size of the faucet, the amount (e.g., distance, etc.) of articulation desired, as well as other suitable design parameters.

Figure 23:
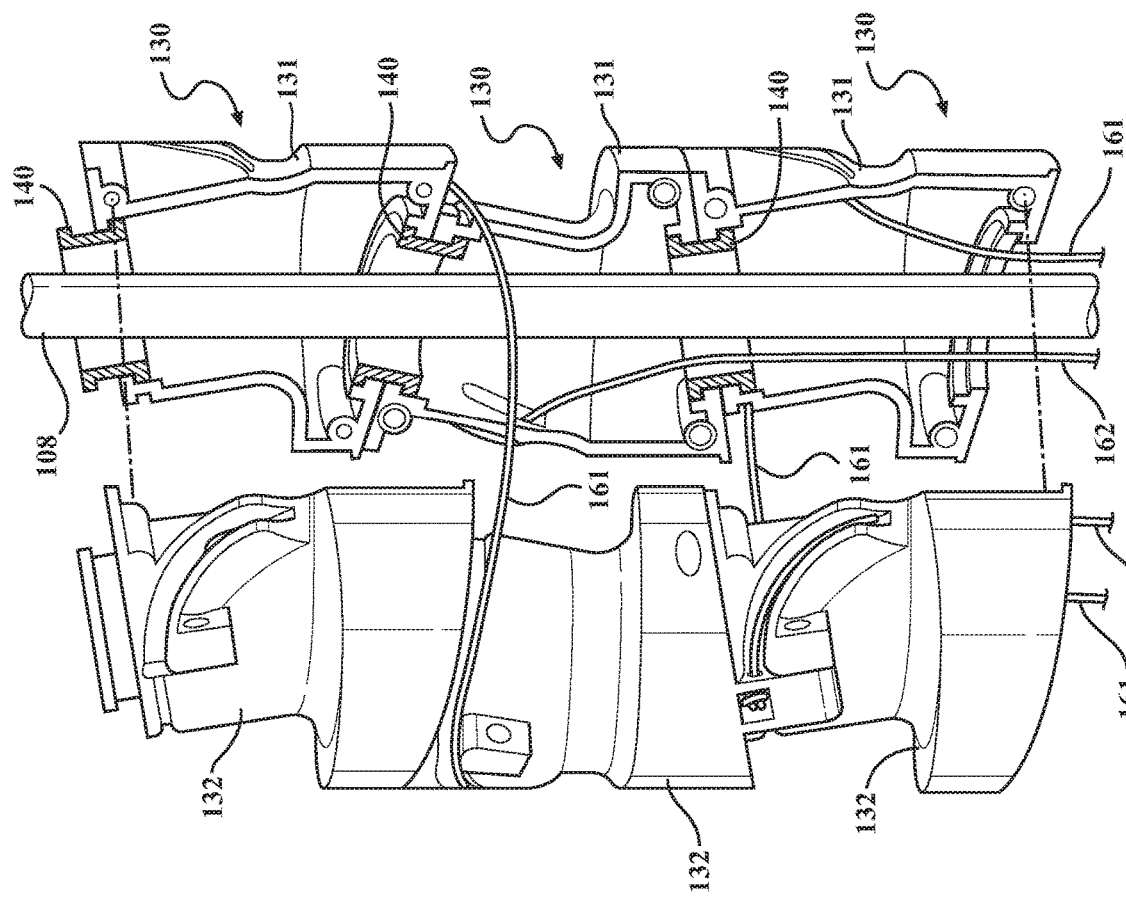
FIG. 23 is a partially exploded view of the three segments and water supply tube shown in FIG. 22.

The end segment of the spout 102 includes the outlet 120. As shown in FIGS. 1 and 2, the end segment 125i having the outlet 120 articulates (e.g., rotate) relative to the adjacent segment 125h, but the end segment 125i is not detachable from the adjacent segment 125h. As shown in FIG. 3, the end segment 125h is detachable from the adjacent segment 125g to reposition the outlet 120 (and end segment) relative to the adjacent segment 125g. The detachable end segment 125h may be configured to articulate (or not to articulate) relative to the adjacent segment 125g depending on the application. The faucet can have a fluid conduit (e.g., a flexible hose 108 as shown in FIGS. 3 and 23) to fluidly connect the outlet 120 to a fluid (e.g., water) supply, the base 101, the valve 107, and/or another element (e.g., component) of the faucet 100. The flexible hose 108, if provided, routes through a cavity or bore in the hollow base 101 and through the segments as discussed below.

Figure 17:
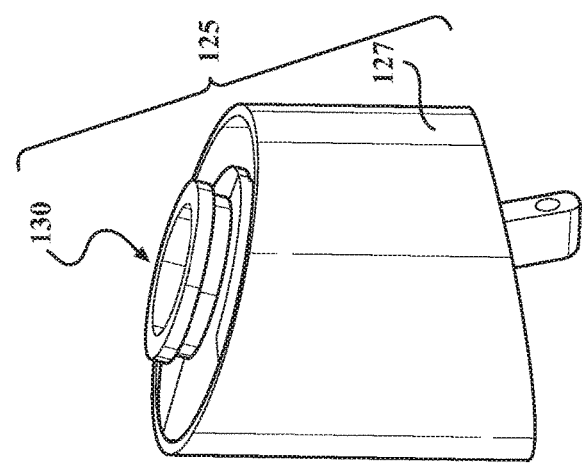
FIG. 17 is a perspective view of the segment shown in FIG. 16.
Figure 16:
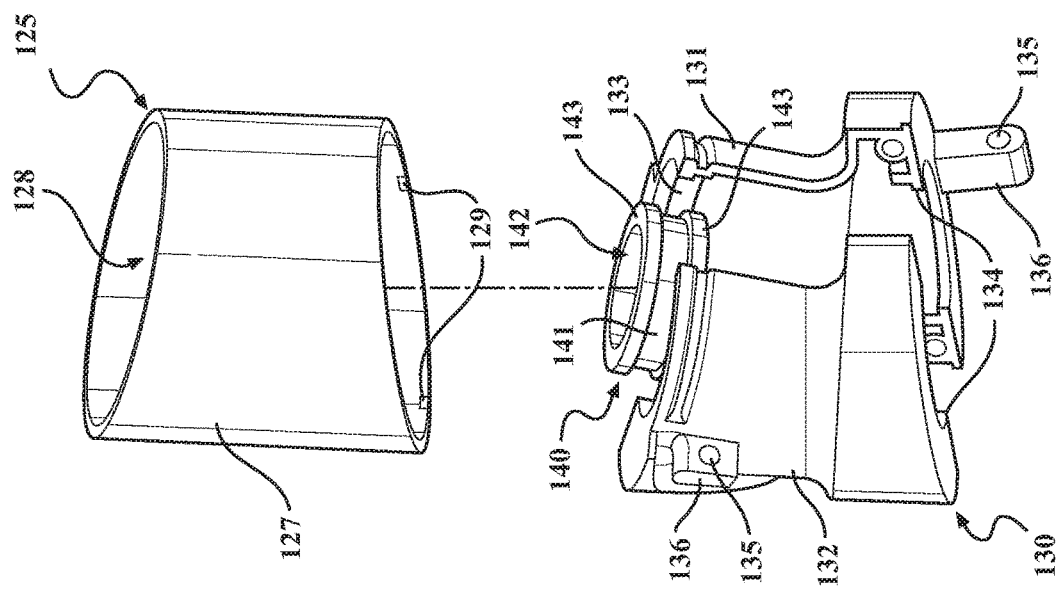
FIG. 16 is an exploded view of an exemplary embodiment of a segment of an articulating faucet, according to this application.

FIGS. 16 and 17 illustrate an exemplary embodiment of a segment 125. As shown, the segment 125 includes a hollow outer body 127 and an inner body 130 disposed within the outer body 127. The outer body 127 fixedly couples to the inner body 130, such that the outer body 127 articulates (e.g., rotates) with the inner body 130. Each outer body 127 defines a portion of an exterior (e.g., an exterior shape) of the spout 102 and the faucet 100. As shown in FIGS. 1 and 2, the outer bodies of the segments 125a-125i define the configuration (e.g., shape, aesthetic finish, etc.) of the spout 102. The outer body of each segment 125a-125i can complement the outer bodies of the other segments and/or the base 101. As shown in FIGS. 16 and 17, the hollow outer body 127 has a substantially cylindrical shape with a bore 128 that receives the inner body 130 therein. The outer body 127 can include one or more locking features 129 that couple the outer body 127 to the inner body 130. For example, each locking feature 129 of the outer body 127 may include a tab (e.g., detent, arm, extension, etc.) that engages a corresponding notch (e.g., recess, channel, etc.) on the inner body 130, or alternatively, each locking feature 129 may include a notch that receives a corresponding tab of the inner body 130.

The inner body 130 is disposed in the bore 128 of the associated outer body 127 when assembled. Each inner body 130 operatively couples to an inner body of an adjacent segment 125 and/or the base 101 (e.g., for the first segment) in a way to provide articulation of the segment (e.g., the inner body 130) relative to the adjacent segment(s) and/or base. As shown in FIG. 16, the inner body 130 includes a first part 131 (e.g., first half) and a second part 132 (e.g., second half) that together retain a bearing 140 between the first and second parts 131, 132 in a coupled position. Each of the first and second parts 131, 132 defines at least part of an annular flange for receiving the bearing 140 to allow articulation (e.g., rotation) between adjacent segments. As shown in FIG. 16, a first (e.g., upper) annular flange 133 is disposed at one end of the inner body 130 for receiving a first bearing 140, and a second (e.g., lower) annular flange 134 is disposed at another (e.g., opposite) end of the inner body 130 for receiving a second bearing 140 (FIG. 23).

As shown in FIG. 16, the bearing 140 includes an annular base 141, a longitudinal bore 142 extending through the base 141 to house and/or route other elements/components of the faucet 100, and a flange 143 extending radially outward around at least part (e.g., all) of the base 141 at each end of the base 141. The bearing 140 is secured in place by receiving one flange 133, 134 of the inner body 130 between the two flanges 143 of the bearing 140. Thus, the flanges 143 and base 141 of the bearing 140 form a channel that receives one flange 133, 134 of the inner body 130 when the first and second parts 131, 132 are coupled together.

Also shown in FIG. 16, each part 131, 132 of each segment 125 includes a magnet 135 that magnetically attracts another magnet 135 (or ferromagnetic element) of another part 131, 132 of an adjacent intervening segment 125 of the plurality of intervening segments 125. The magnets can attract in either the first position or the second position. Each magnet 135 can be embedded in a tab 136 (e.g., projection) extending from the part as shown, or can be located elsewhere in the segment.

Figure 18:
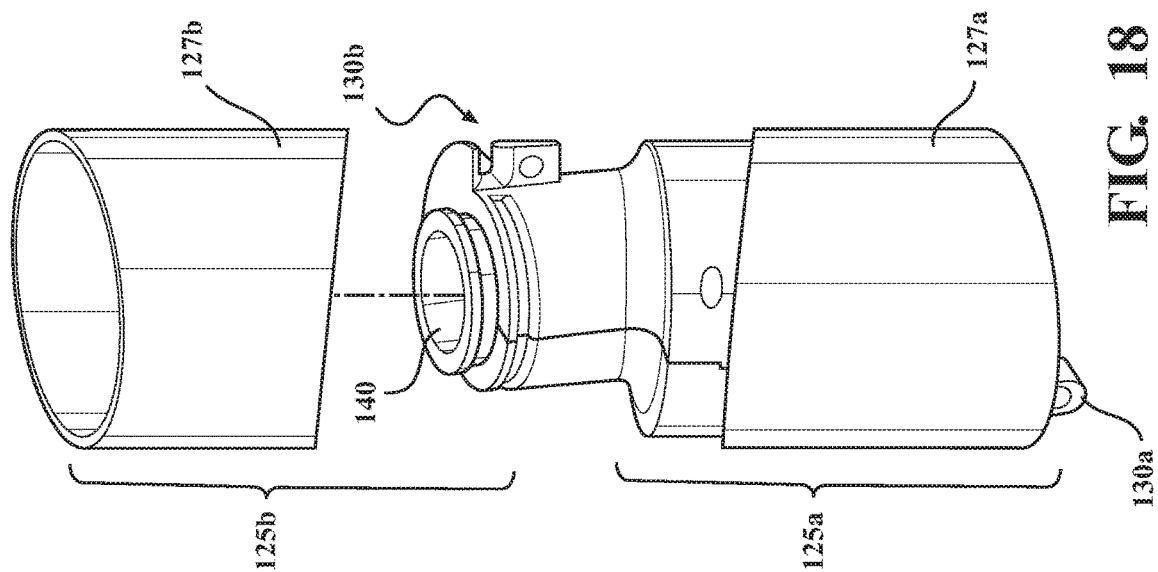
FIG. 18 is a partially exploded view of two segments of an articulating faucet.

FIG. 17 illustrates one assembled segment 125 having one inner body 130 disposed within (e.g., inside of) the bore 128 of one outer body 127. FIG. 18 illustrates two adjacent segments 125a, 125b operatively coupled together, with the outer body 127b of the second segment 125b above (and prior to coupling to) the second inner body 130b. The first inner body 130a is rotatably coupled to the second inner body 130b through a bearing 140 (like the bearing 140 shown). Another bearing 140 (shown) is disposed at the top of the second inner body 130b for rotatably coupling to another segment (not shown).

Figure 21:
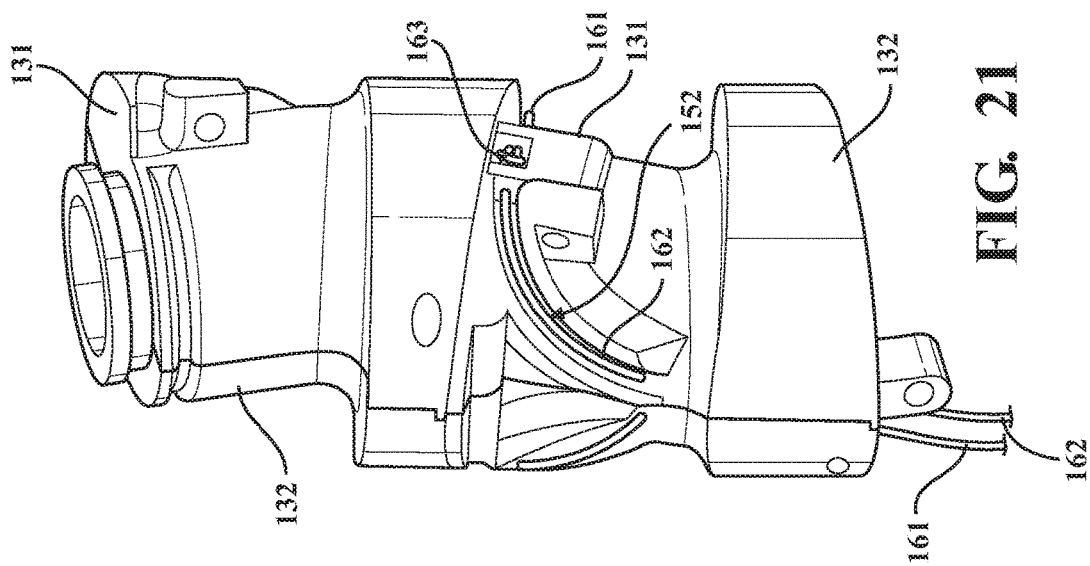
FIG. 21 is another perspective view of the two segments shown in FIG. 20.
Figure 20:
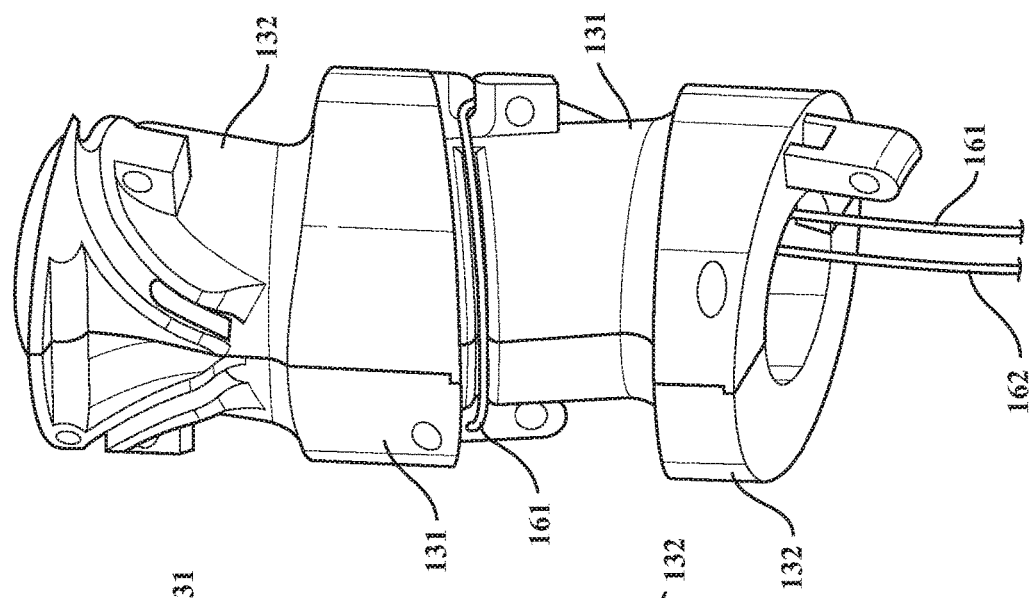
FIG. 20 is another perspective view of the two segments shown in FIG. 19.
Figure 19:
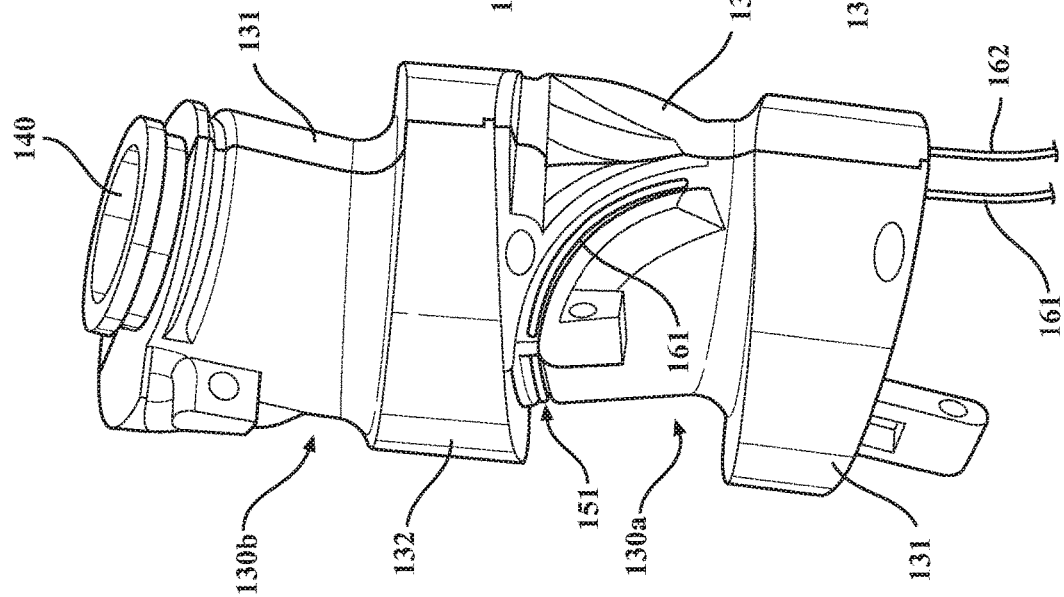
FIG. 19 is a perspective view of two segments of an articulating faucet with the outer shells removed for clarity.

FIGS. 19-21 illustrate two adjacent segments 125a, 125b with the outer bodies 127a, 127b removed to show an exemplary method of articulating the segments using wires. Each inner body 130a, 130b includes a first channel 151 for receiving a first wire 161 and a second channel 152 for receiving a second wire 162. According to an exemplary embodiment, each wire 161, 162 is braided Kevlar®. However, other types of wire can be used (e.g., employed). Each channel 151, 152 is recessed into the body 130 to protect the wire. As shown, the first wire 161 moves the body 130 (and segment 125) in a first direction corresponding to the water flow through the faucet being turned on, and the second wire 162 moves the body 130 in a second direction, opposite to the first direction, corresponding to the water flow through the faucet being shut-off. For example, pulling the first wire 161 articulates (e.g., move, rotate, etc.) the segment 125 to its use position in response to the water flow being turned on in the faucet, and pulling the second wire 162 articulates the segment 125 to its non-use position in response to the water flow being turned off in the faucet. A portion of each wire (e.g., an end) is coupled to a portion of the associated body 130 to move the segment 125. As shown in FIG. 21, an end 163 of the first wire 161 is tied (e.g., knotted) to the first part 131 of the body 130 to retain the wire 161. Similarly, the second wire 162 can be tied to the inner body 130. Alternative ways (e.g., fasteners, adhesive, welding, etc.) may be employed to retain each wire to the body.

Figure 22:
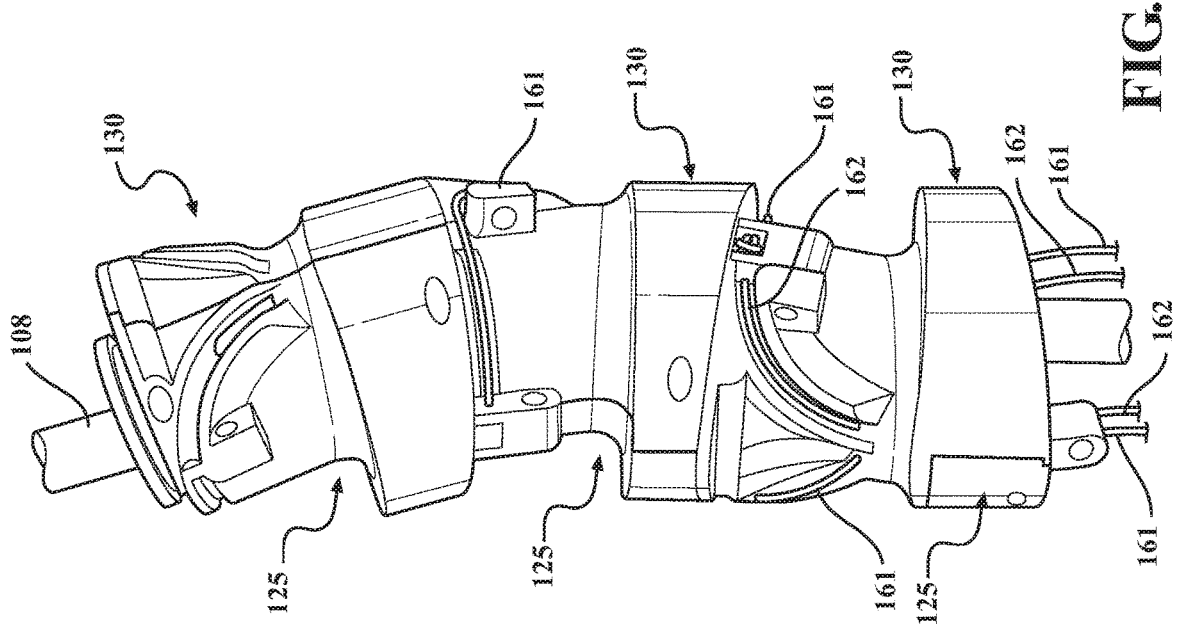
FIG. 22 is a perspective view of three segments of an articulating faucet without outer shells and including a water supply tube passing through the segments.

FIGS. 22 and 23 illustrate three adjacent segments 125 operatively coupled together with the outer bodies 127 removed for clarity. Two first wires 161 are also shown, with one first wire 161 employed and cooperating with each of the lower two segments 125. During articulation of the faucet, pulling the first wires 161 simultaneously moves the two segments 125 at the same time. The first wires 161 can be pulled sequentially to move the two segments 125 sequentially, or the first wires 161 can be pulled in other suitable orders. As shown, portions of the wires 161, 162 route external to the associated inner body 130 and other portions route internal to the inner body 130. FIG. 23 shows the two parts of each inner body 130 separated to see the routing of the wires 161, 162 internal to the bodies 130, as well as the routing of the hose 108 within the bodies 130 (i.e., through the bores thereof).

Figure 24:
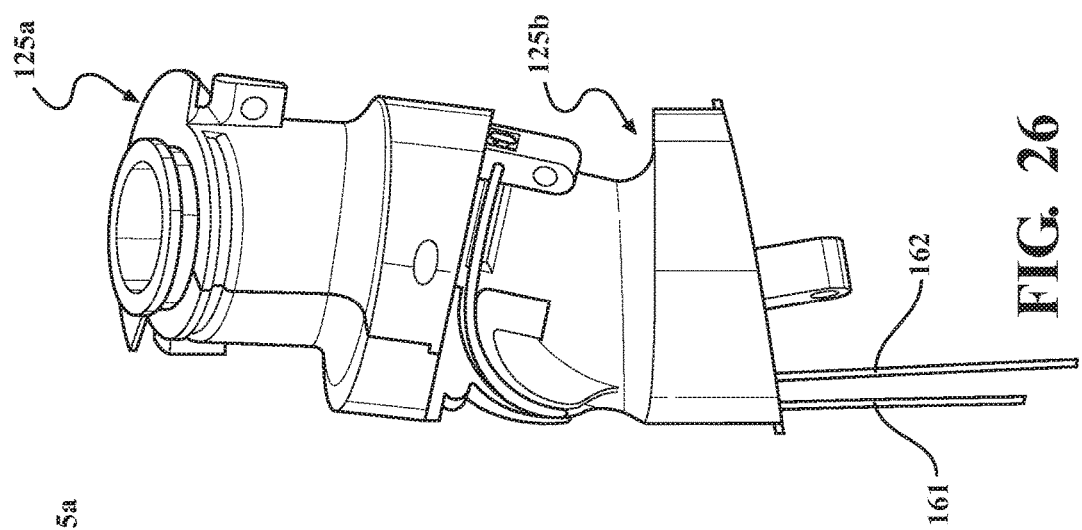
FIG. 24 is a perspective view of two segments of an articulating faucet with the outer shells shown in a first relative rotational position.
Figure 25:
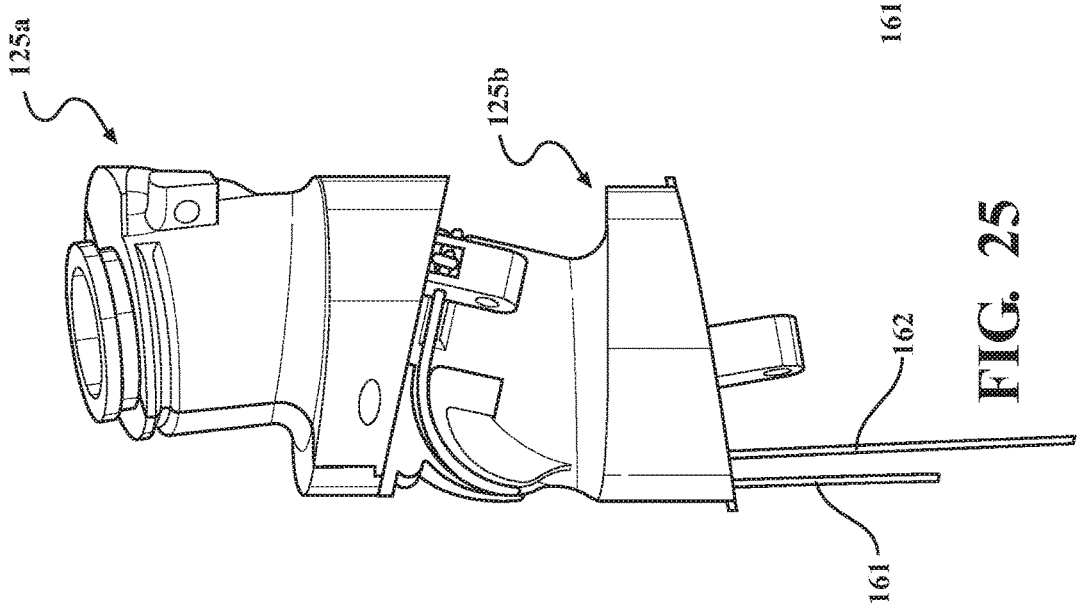
FIG. 25 is another perspective view of two segments shown in FIG. 24 in a second relative rotational position.
Figure 26:
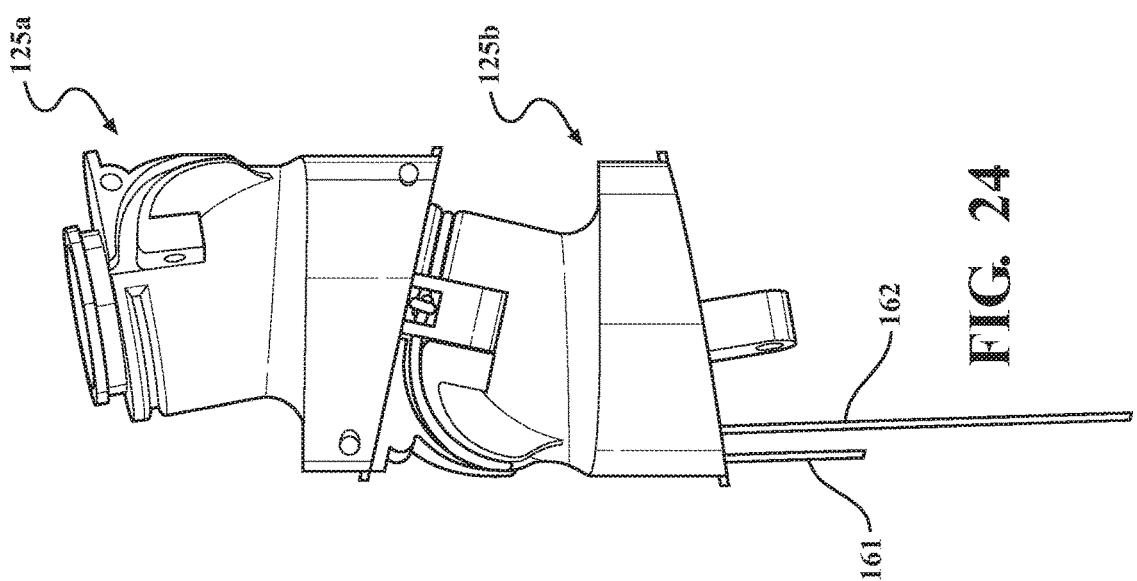
FIG. 26 is another perspective view of two segments shown in FIG. 24 in a third relative rotational position.
Figure 27:
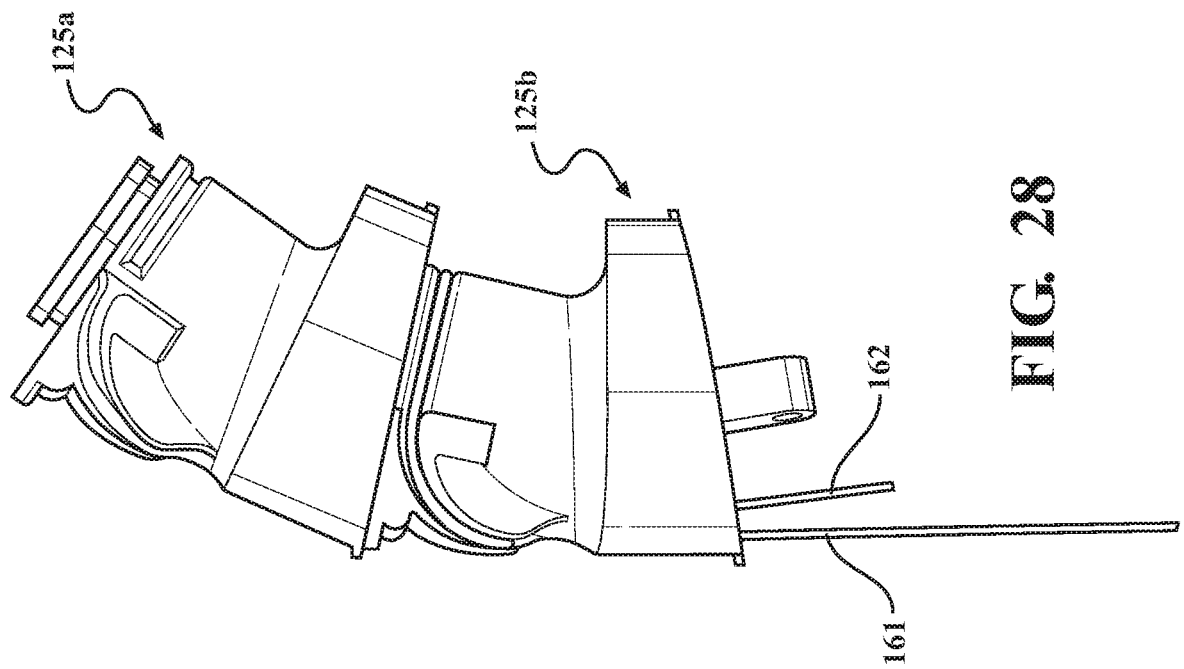
FIG. 27 is another perspective view of two segments shown in FIG. 24 in a fourth relative rotational position.
Figure 28:
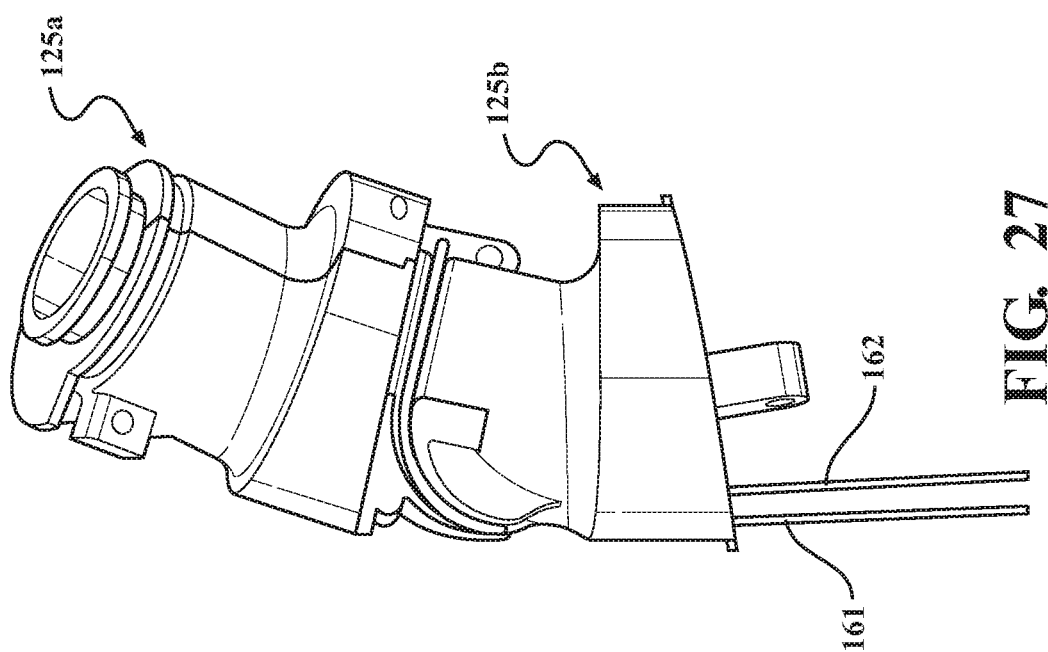
FIG. 28 is another perspective view of two segments shown in FIG. 24 in a fifth relative rotational position.

FIGS. 24-28 illustrate movement of a top segment 125a relative to an adjacent bottom segment 125b through the wires 161, 162. FIG. 24 shows the two segments 125a, 125b in a non-use position (e.g., an initial position with zero degrees of rotation between the top segment 125a and the bottom segment 125b). FIG. 25 shows the top segment 125a after a rotation of thirty degrees (30°) relative to the bottom segment 125b by pulling on the first wire 161 by a first distance in a first direction, which in turn pulls the second wire 162 in a second opposite direction by the first distance. FIG. 26 shows the top segment 125a after a rotation of sixty degrees (60°) relative to the bottom segment 125b by pulling on the first wire 161 by a second distance in the first direction, which in turn pulls the second wire 162 in the second direction by the second distance. FIG. 27 shows the top segment 125a after a rotation of 90 degrees (90°) relative to the bottom segment 125b by pulling the first wire 161 by a third distance in the first direction, which in turn pulls the second wire 162 in the second direction by the third distance. FIG. 28 shows the top segment 125a after a rotation of 180 degrees (180°) relative to the bottom segment 125b by pulling the first wire 161 by a total distance (Dtotal) in the first direction, which in turn pulls the second wire 162 by the total distance in the second direction.

The faucet 100 includes an actuator that controls articulation of the one or more segments 125 of the spout 102. The actuator can be a mechanical actuator, an electro-mechanical actuator, a fluid actuator, or other suitable actuator. A mechanical actuator can manually articulate the spout 102 by moving the one or more segments 125 at the same time or at different times (e.g., sequentially, random). By way of example, the mechanical actuator can include a knob, a lever, a handle, or other suitable element that articulates the segments of the faucet 100 upon actuation (e.g., movement) of the mechanical actuator. Also for example, the spout 102 can be configured to be manually articulated by a user whom moves the spout from the first position to the second position such as by moving the spout itself.

FIGS. 11-15 illustrate an example of a manual actuator 200 made to conceptually show articulation of the segments 125 of a fabricated faucet 100. The actuator 200 includes a frame 201, a plurality of first arms 202 associated with the first wires 161, and a plurality of second arms 203 associated with the second wires 162. One first arm 202 is provided for each first wire 161, and each first arm 202 is pivotally coupled to the frame 201 at a pivot end and is coupled to a portion (e.g., end) of the associated first wire 161 at (or near) the opposite end. Similarly, one second arm 203 is provided for each second wire 162, and each second arm 203 is pivotally coupled to the frame 201 at a pivot end and is coupled to a portion of the associated second wire 162 at (or near) the opposite end. A pulley or pulley system can be employed with each of the arm 202, 203 to influence the motion of the wire based on the rotation of the arm 202, 203. Notably, size of the manual actuator 200 relative to the faucet 100 is not limiting, as size of the manual actuator 200 shown can be reduced (it was constructed for ease of actuation).

The faucet 100 can include an electro-mechanical actuator that automatically articulates the spout 102. The electro-mechanical actuator includes one or more motors (e.g., stepper motors) configured to pull the wires 161, 162 between the use and non-use positions. A gearing system (e.g., gear reduction system) can be employed to control movement of the wires 161, 162 by the one or more motors.

Figure 29:
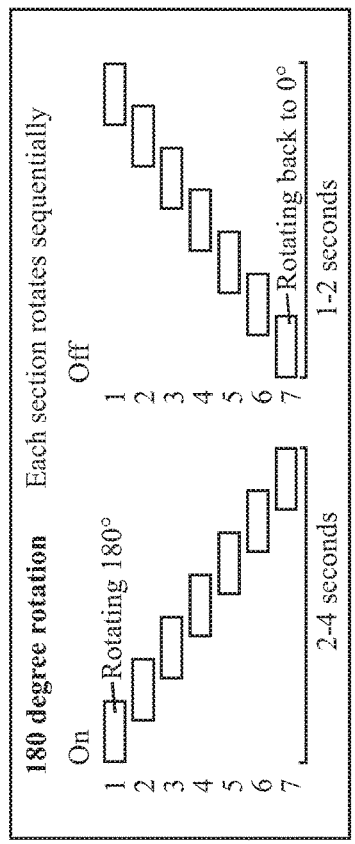
FIG. 29 is a graph showing an exemplary sequence of the segments for a faucet.

The plurality of segments 125 of the spout 102 can be configured to articulate (e.g., rotate) in various ways. For example, the plurality of segments 125 can be configured to rotate sequentially in consecutive order, such as starting with the first segment 125a and ending with an end (e.g., last) segment (e.g., segment 125i in FIG. 1, segment 125h in FIG. 3, segment 7 in FIG. 9, etc.) of the plurality of segments 125. With reference to FIGS. 1 and 2, the sequence of articulation would be segment 125a, then segment 125b, then segment 125c, then segment 125d, then segment 125e, then segment 125f, then segment 125g, then segment 125h, and then segment 125i. For this method of articulation, the movement of the segments can overlap (e.g., the second segment 125b can begin articulating after the first segment 125a begins articulating but before the first segment 125a is finished articulating) as shown in FIG. 29, or the segments can move one at a time (e.g., the second segment 125b begins articulating only after the first segment 125a is finished articulating, etc.). The segments can be configured to articulate sequentially starting with a different segment, such as starting with an end segment and sequencing rearward (e.g., descending) or forward (e.g., ascending), or may start sequencing with any segment and move rearward or forward.

Also for example, the plurality of segments 125 can articulate substantially simultaneously to move the faucet 100 and the outlet 120 thereof between the first and the second positions. Thus, each segment of the plurality of segments 125 can begin articulating approximately at the same time.

Also for example, the plurality of segments 125 can articulate randomly to move the faucet 100 and the outlet 120 thereof between the first and the second positions. The articulation can be completely random, where the sequence of articulation of the segments may be different each successive articulation. The faucet 100 may include a controller that controls the random articulation of the segments. The random articulation can be repeatable randomness, where the sequence is the same from each articulation to the subsequent articulation, but the order that the segments articulate is not in consecutive order or simultaneous order.

Also for example, each segment of the plurality of segments 125 can be rotated by a force created by a flow of water through the faucet (e.g., to the outlet). The force can be generated by water that flows toward the outlet of the faucet (e.g., through the faucet). In this way, water can route into a first segment, which then rotates by the force of water from a first position to a second position; then water flowing from the first segment to a second segment can rotate the second segment from a first position to a second position, and so forth sequentially through all of the segments.

FIG. 29 shows an exemplary sequence of actuation for a faucet having seven segments (segments 1-7). As shown, when the faucet is in a first mode of operation (e.g., an on mode where water flows to the outlet), segment 1 is the first to begin articulating, then segment 2, then segment 3 and so forth ending with segment 7, with each subsequent segment overlapping with the prior segment (i.e., the next segment in the sequence begins articulating before the prior segment is fully articulated). FIG. 29 also shows that when the faucet goes from the on mode of operation to a second mode of operation (e.g., an off mode where water ceases to flow to the outlet), the segments articulate in the reverse order with segment 7 articulating first, then segment 6, then segment 5 and so forth ending with segment 1. Again, articulation of each segment overlaps with the articulation of the prior segment. Also shown in FIG. 29, the time from start to finish going from "on mode" to "off mode" is approximately two to four seconds (~2-4 s), while the time from start to finish going from "off mode" to "on mode" is approximately one to two seconds (~1-2 s). According to other embodiments, these times can be reversed or changed, such as to tailor these times.

Figure 30:
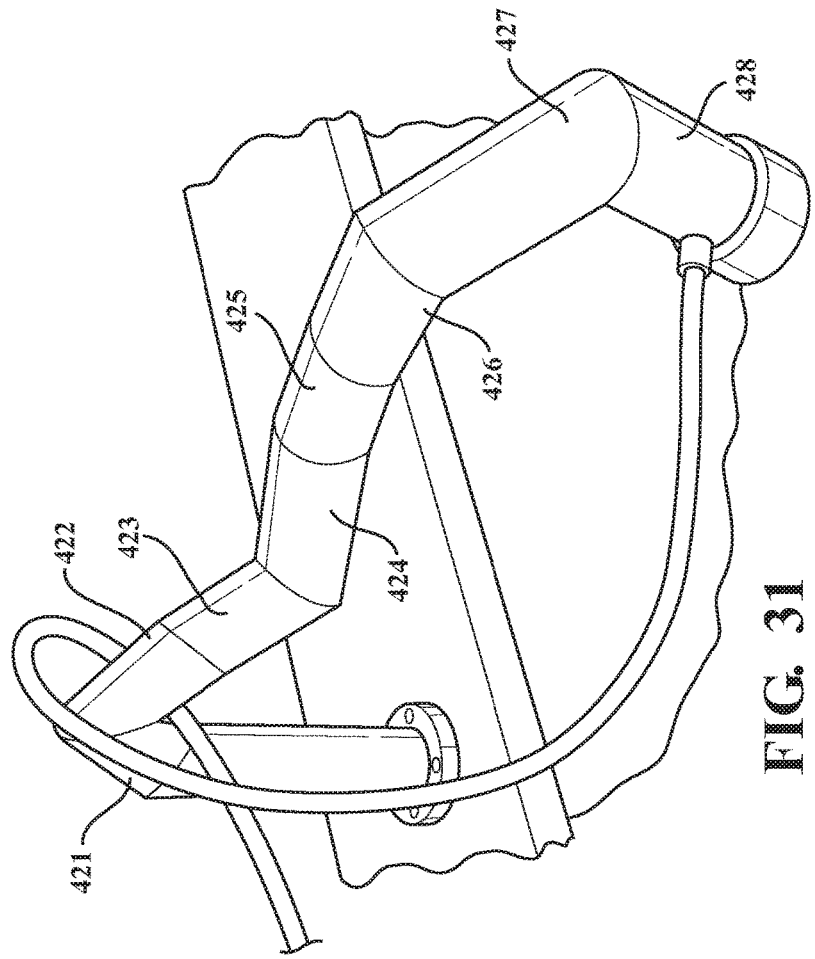
FIG. 30 is a perspective view of a flexible coupling for use in the articulating faucets of this application.

FIG. 30 illustrates an additional example of flexible couplings that can be employed in connecting together adjacent segments and/or segment(s) to the base, such as the segments 125 of the faucet 100. The illustrated coupling 210 includes two bushings 211, 212 coupled to a webbing 213 (e.g., a flexible webbing, a rigid webbing) to allow for rotation of a first shaft 215 engaging (e.g., received by) the first bushing 211 relative to a second shaft 216 engaging the second bushing 212.

Figure 35:
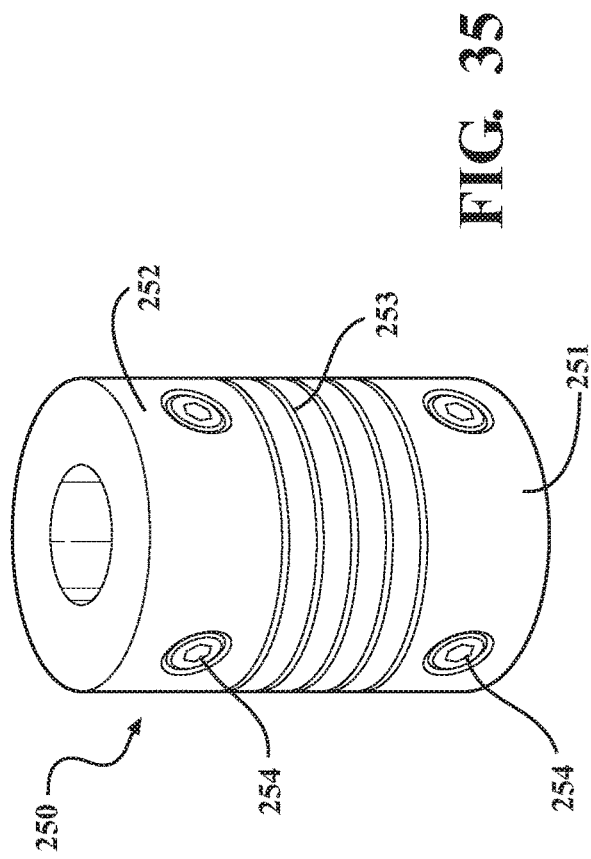
FIG. 35 is a perspective view of a flexible coupling for use in the articulating faucets of this application.
Figure 36:
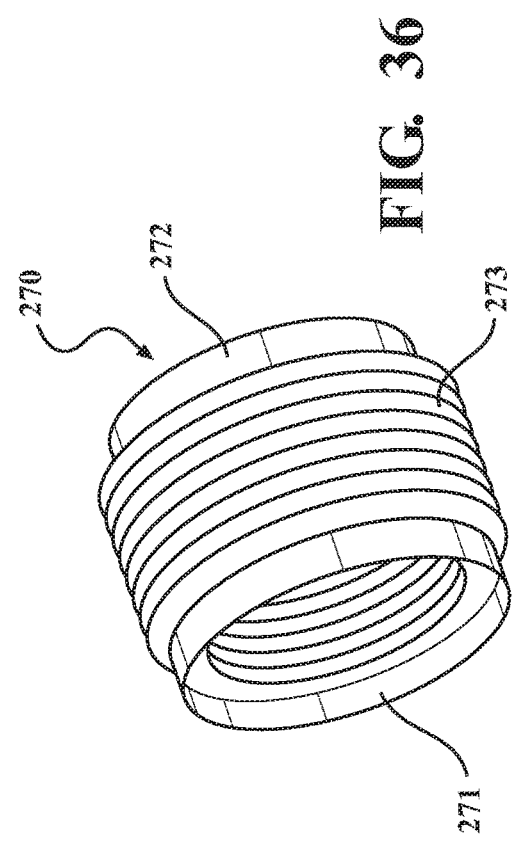
FIG. 36 is a perspective view of a flexible coupling for use in the articulating faucets of this application.
Figure 34:
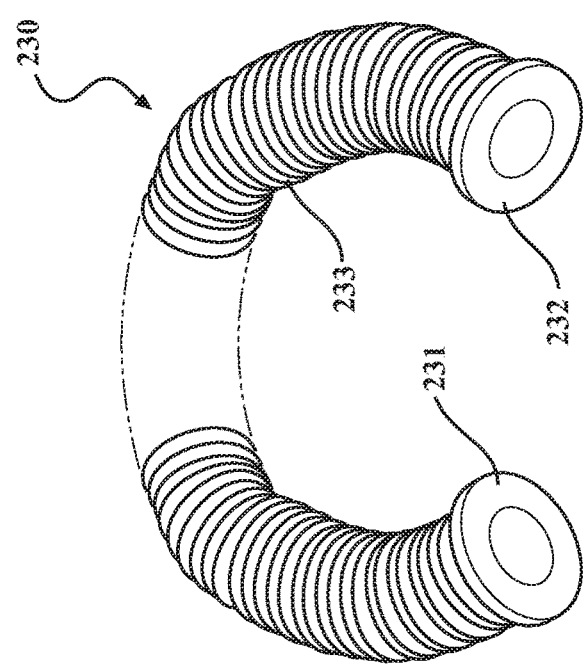
FIG. 34 is a perspective view of a flexible coupling for use in the articulating faucets of this application.

FIGS. 34-36 illustrate additional examples of flexible couplings that can be used with the faucets disclosed herein. FIG. 34 shows a coupling 230 including a first bushing end 231, a second bushing end 232, and a flexible hollow conduit 233 interconnecting the first and second bushing ends 231, 232. The bushing ends 231, 232, as shown, are rotatable relative to one another. However, according to other embodiments, the ends 231, 232 can be rotatably fixed relative to one another. The conduit 233 can be manipulated (e.g., bent, moved, compressed, extended, etc.) such as to reposition the ends 231, 232 relative to one another. FIG. 35 shows a coupling 250 having a sleeve shape and including a first bushing end 251, a second bushing end 252, and a non-flexible or less flexible hollow section 253 connecting the first and second bushing ends 251, 252 together. The ends 251, 252 can be rotatable or rotatably fixed relative to one another, and each end 251, 252 includes a bore, which can receive a post, shaft, pipe or similar member, such as to transmit rotation. One or more set screws 254 can be used to secure a post, shaft, pipe or similar member to an end 251, 252, such as to transmit rotation. FIG. 36 shows a coupling 270 that includes a first end 271, a second end 272, and a flexible hollow expandable corrugated sleeve 273 interconnecting the first and second ends 271, 272, such that the ends 271, 272 can flex relative to one another. That is, the sleeve 273 is expandable and at least somewhat flexible in an expanded position so that the ends 271, 272 are repositionable relative to one another.

Figure 31:
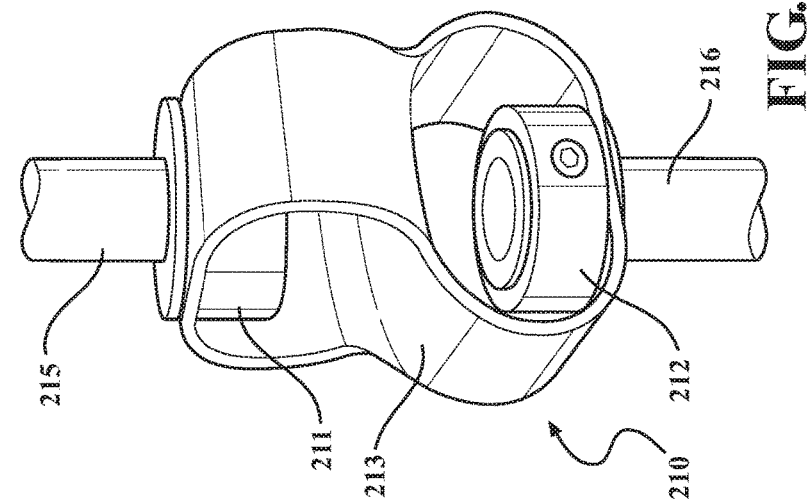
FIG. 31 is a perspective view of another exemplary embodiment of an articulating faucet.

FIG. 31 illustrates another faucet 400 having a plurality of segments 421-428 having different configurations (e.g., size, shape, etc.) relative to one another. The faucet 400 can articulate into different shapes between or in its various modes of operation, which do not have to include the more traditional J-shape. The segments 421-428 allow the shape of the faucet 400 to be tailored.

Figure 33:
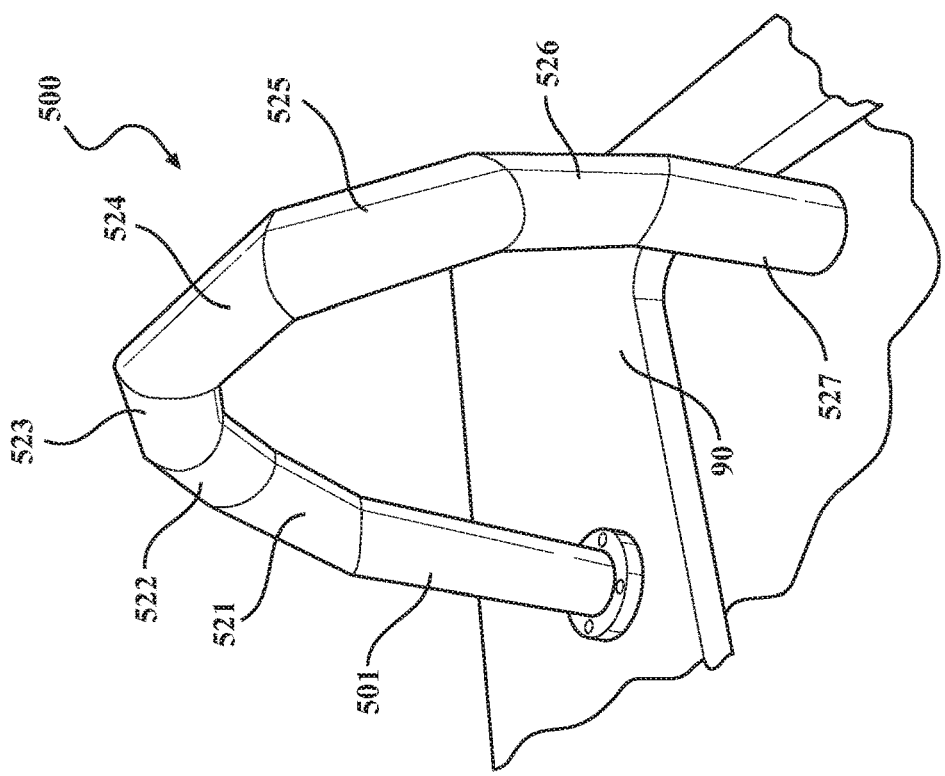
FIG. 33 is another perspective view of the articulating faucet shown in FIG. 32.
Figure 32:
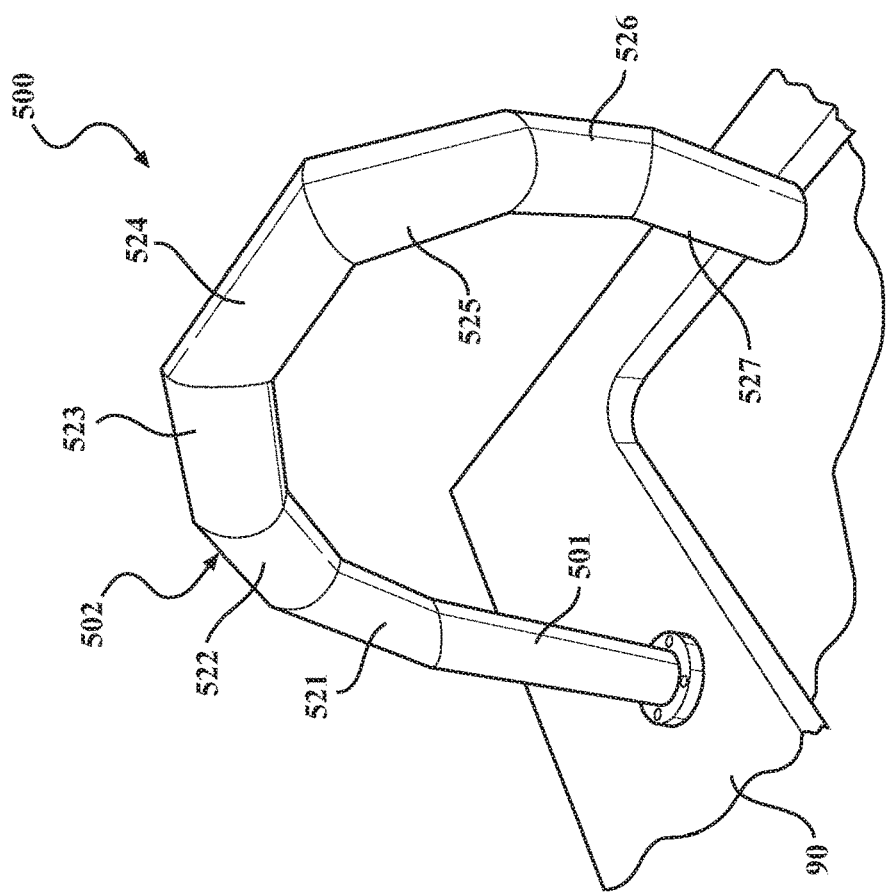
FIG. 32 is a perspective view of another exemplary embodiment of an articulating faucet.

FIGS. 32 and 33 illustrate another faucet 500 having a base 501, which is shown mounting to the sink deck 90, and a spout 502 that operatively couples to the base 501. The spout 502 includes a plurality of articulating segments. As shown, the spout 502 has seven segments 521-527 that articulate relative to the base 501 and to one another. The segments 521-527 are arranged sequentially, with the first segment 521 coupled to the base 501, the second segment coupled to the first segment 521, the third segment 523 coupled to the second segment 522 and so forth. The segments 521-527 can have the same shape or different shapes. It is noted that the number and shape of the segments can produce faucets having any desired shape upon articulation of the segments.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the faucets as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., base, spout, segment, valve, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A faucet comprising:
    a base configured to mount to a support;
    an articulable spout comprising:
        an outlet for dispensing water; and
        a plurality of segments operatively coupled together sequentially, wherein a first segment of the plurality of segments is rotatably coupled to the base;
    a valve operable in an open position and a closed position to control a flow of water to the outlet;
    wherein the plurality of segments are rotatable relative to one another and to the base to move the outlet between a first position, in which the valve is in the closed position, and a second position, in which the valve is in the open position; and
    an actuator operatively coupled to a segment of the plurality of segments and configured to rotate the segment relative to a sequential segment of the plurality of segments to automatically move the outlet between the first position and the second position.

2. The faucet of claim 1, wherein the plurality of segments rotate sequentially starting with the first segment and ending with an end segment of the plurality of segments, and wherein the end segment includes the outlet.

3. The faucet of claim 1, wherein the plurality of segments rotate randomly to move the outlet between the first and the second positions.

4. The faucet of claim 1, wherein the plurality of segments rotate substantially simultaneously to move the outlet between the first and the second positions.

5. The faucet of claim 1, wherein the actuator rotates each segment of the plurality of segments, the actuator comprising:
    a motor; and
    a cable operatively coupled to the motor and to the segment such that the motor can rotate the segment through the cable.

6. The faucet of claim 5, wherein the actuator further comprises a plurality of cables operatively coupled to the motor, wherein each of the plurality of cables is associated with a corresponding segment of the plurality of segments to rotate each of the plurality of segments with the actuator.

7. The faucet of claim 1, wherein each segment of the plurality of segments is rotated by a force created by the flow of water to the outlet.

8. The faucet of claim 1, further comprising a universal joint rotatably coupling at least one pair of adjacent segments of the plurality of segments.

9. The faucet of claim 1, wherein the plurality of segments form a substantially cylindrical shaped spout when the outlet is in the first position, and wherein the plurality of segments form a non-cylindrical shape spout when the outlet is in the second position.

10. The faucet of claim 1, wherein the plurality of segments form an arcuate shaped spout when the spout is in the second position such that the base and the spout together have a substantially inverted J-shape, and wherein the plurality of segments form a shape that is different than the arcuate shape spout when the outlet is in the first position.

11. A faucet comprising:
a stationary base having a first end, which is mountable to a support;
a spout operatively coupled to a second end of the base, wherein the spout has an outlet for dispensing water and the spout is articulable relative to the base between a first position and a second position;
an actuator operatively coupled to the spout and configured to rotate the spout relative to the base to automatically move the outlet between the first position and the second position;
wherein in the first position, the base and the spout together have a substantially cylindrical shape; and
wherein in the second position, the base and the spout together have a substantially inverted J-shape.

12. The faucet of claim 11, wherein the spout comprises a plurality of segments operatively coupled together sequentially, and wherein each segment of the plurality of segments is articulable relative to the other segments of the plurality of segments and relative to the base to move the spout between the first and second positions.

13. The faucet of claim 12, wherein a first segment of the plurality of segments is rotatably coupled to the base, and wherein each additional segment of the plurality of segments is rotatable relative to the first segment and the base to move the spout between the first and second positions.

14. The faucet of claim 13, wherein the spout further comprises an end segment having the outlet, wherein the end segment is detachable from an adjacent segment of the plurality of segments, and wherein a flexible hose fluidly connects the outlet of the end segment to the base.

15. The faucet of claim 13, wherein the plurality of segments comprises an end segment having the outlet, and wherein the end segment is rotatably coupled to an adjacent segment of the plurality of segments.

16. A faucet comprising:
a base extending along a longitudinal axis and having a first end that is configured to mount to a support;
a spout comprising:
a first segment movably coupled to a second end of the base;
a last segment having an outlet for dispensing water; and
a plurality of intervening segments provided between the first segment and the last segment; and
an actuator operatively coupled to the plurality of intervening segments,
wherein each of the plurality of intervening segments is movable by the actuator relative to the first segment to move the last segment between a first position, in which each segment of the plurality of intervening segments is aligned along the longitudinal axis, and a second position, in which each segment of the plurality of intervening segments is aligned along an arcuate axis.

17. The faucet of claim 16, wherein each segment of the plurality of intervening segments comprises:
a hollow inner body defining a bore through which a water line is configured to route, each inner body being configured to rotatably couple to the inner body of at least one adjacent intervening segment of the plurality of intervening segments; and
an outer body fixedly coupled to the associated inner body such that the outer body rotates with the associated inner body, the outer body defining a portion of an exterior shape of the faucet.

18. The faucet of claim 17, wherein each segment of the plurality of intervening segments further comprises a bearing disposed in the associated bore between the associated inner body and the water line, and wherein each bearing has an annular channel that receives an annular flange of the associated inner body to retain the bearing relative to the inner body.

19. The faucet of claim 18, wherein the inner body comprises a first part and a second part, each of the first and second parts defines at least part of the annular flange, each segment of the plurality of intervening segments further comprises a magnet that is configured to magnetically attract another magnet of an adjacent intervening segment of the plurality of intervening segments in at least one of the first and second positions, and the arcuate axis that intersects the longitudinal axis.

20. The faucet of claim 18, further comprising:
a first cable configured to route through a first channel of at least one intervening segment of the plurality of intervening segments; and
a second cable configured to route through a second channel of the at least one intervening segment of the plurality of intervening segments;
wherein the first cable is configured to rotate the at least one intervening segment in a first rotational direction about a pivot axis, the second cable is configured to rotate the at least one intervening segment in a second rotational direction about the pivot axis, and the second rotational direction is opposite the first rotational direction.

* * * * *